(12) United States Patent
Covello et al.

(10) Patent No.: US 10,363,917 B2
(45) Date of Patent: Jul. 30, 2019

(54) ENHANCED RAILWAY EQUIPMENT AND RELATED INTEGRATED SYSTEMS

(71) Applicant: DAVANAC INC., Dorval (Quebec) (CA)

(72) Inventors: Luigi Covello, Dorval (CA); Varoujan Khatchadourian, Dorval (CA)

(73) Assignee: DAVANAC INC., Dorval (Quebec) (CA)

(*) Notice: Subject to any disclaimer, the term of this patent is extended or adjusted under 35 U.S.C. 154(b) by 0 days.

(21) Appl. No.: 15/842,533

(22) Filed: Dec. 14, 2017

(65) Prior Publication Data

US 2018/0162344 A1    Jun. 14, 2018

Related U.S. Application Data

(60) Provisional application No. 62/433,993, filed on Dec. 14, 2016.

(51) Int. Cl.

| *B60T 17/22* | (2006.01) |
| *G07C 5/08* | (2006.01) |
| *G01L 19/14* | (2006.01) |
| *G01L 19/08* | (2006.01) |
| *B61H 13/00* | (2006.01) |
| *B60T 13/66* | (2006.01) |
| *G01M 3/28* | (2006.01) |
| *B61D 7/00* | (2006.01) |

(52) U.S. Cl.
CPC .......... *B60T 17/228* (2013.01); *B60T 13/665* (2013.01); *B61H 13/00* (2013.01); *G01L 19/083* (2013.01); *G01L 19/143* (2013.01); *G01M 3/2815* (2013.01); *G07C 5/08* (2013.01); *G07C 5/0825* (2013.01); *B61D 7/00* (2013.01)

(58) Field of Classification Search
USPC ........................................................ 701/33.3
See application file for complete search history.

(56) References Cited

U.S. PATENT DOCUMENTS

| 2,403,938 | A | | 7/1946 | Macan | |
| 2,674,121 | A | | 4/1954 | Gorman | |
| 4,487,060 | A | | 12/1984 | Pomeroy | |
| 5,083,274 | A | | 1/1992 | Bezos et al. | |
| 5,131,612 | A | * | 7/1992 | Skantar | B61L 3/002 |
| | | | | | 246/107 |
| 6,095,618 | A | | 8/2000 | Heneka et al. | |
| 6,619,138 | B2 | * | 9/2003 | Kettle, Jr. | B60T 13/683 |
| | | | | | 73/861.52 |
| 9,616,876 | B2 | * | 4/2017 | Allwardt | B60T 17/228 |

(Continued)

*Primary Examiner* — Tyler D Paige
(74) *Attorney, Agent, or Firm* — Alston & Bird LLP

(57) ABSTRACT

Methods, systems and a kit for indicating brake air pressure status in brake pipes of multiple interconnected train cars are provided. The methods include operating at least one end-hose adapter per train car. Each end-hose adapter is mounted between a train car end hose and a brake pipe to be in fluid communication therewith and are configured to sense the brake air pressure in the brake pipe. Each end-hose adapter kit includes connections adapters for connecting either end to different parts of the train car system. The end-hose adapter provides a first visual indication when the brake air pressure is within an operable range and/or a second visual indication when the brake air pressure is below an operable value and is experiencing leakage.

24 Claims, 26 Drawing Sheets

(56) References Cited

U.S. PATENT DOCUMENTS

| | | | |
|---|---|---|---|
| 2003/0066360 A1* | 4/2003 | Kettle, Jr. | B60T 13/683 |
| | | | 73/861.52 |
| 2005/0022587 A1* | 2/2005 | Tentrup | G01M 13/025 |
| | | | 73/116.06 |
| 2009/0095578 A1* | 4/2009 | Besler | F16D 65/0043 |
| | | | 188/72.5 |
| 2009/0223760 A1* | 9/2009 | Smith | B60T 13/665 |
| | | | 188/3 H |
| 2013/0013268 A1* | 1/2013 | Woolf | G06F 17/50 |
| | | | 703/1 |
| 2013/0307972 A1* | 11/2013 | Stone | H04N 7/181 |
| | | | 348/143 |
| 2013/0307980 A1* | 11/2013 | Stone | H04N 7/181 |
| | | | 348/148 |
| 2013/0307989 A1* | 11/2013 | Stone | H04N 7/181 |
| | | | 348/159 |
| 2013/0312043 A1* | 11/2013 | Stone | H04W 4/38 |
| | | | 725/62 |
| 2014/0156137 A1* | 6/2014 | Mayer | G06F 11/3636 |
| | | | 701/33.4 |
| 2014/0260518 A1* | 9/2014 | Swar | G01L 27/005 |
| | | | 73/1.57 |
| 2016/0107631 A1 | 4/2016 | Wallace et al. | |
| 2016/0318491 A1 | 11/2016 | Seaton | |

* cited by examiner

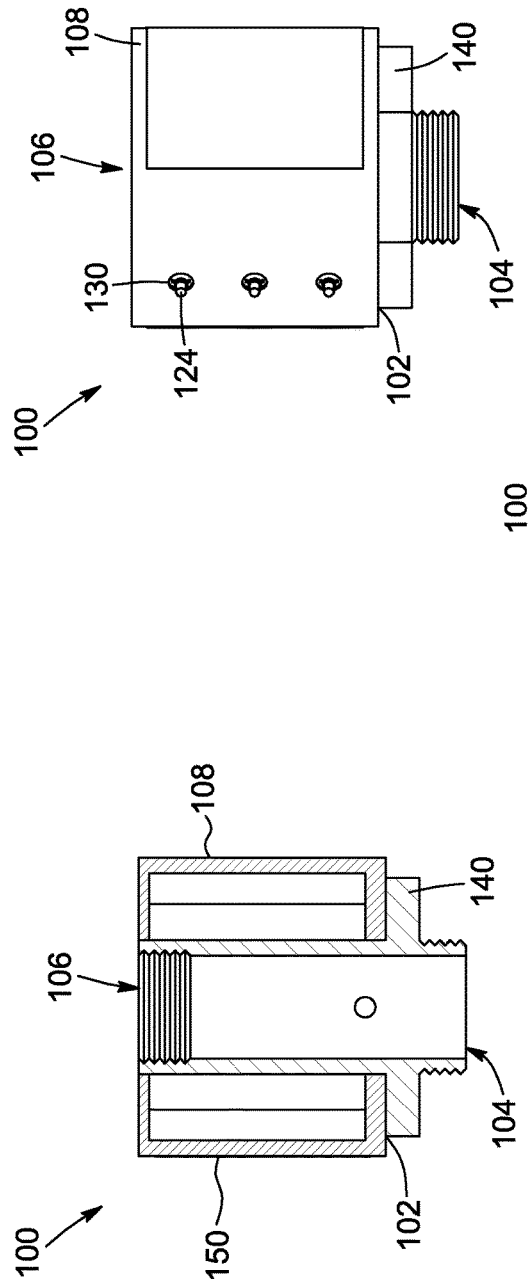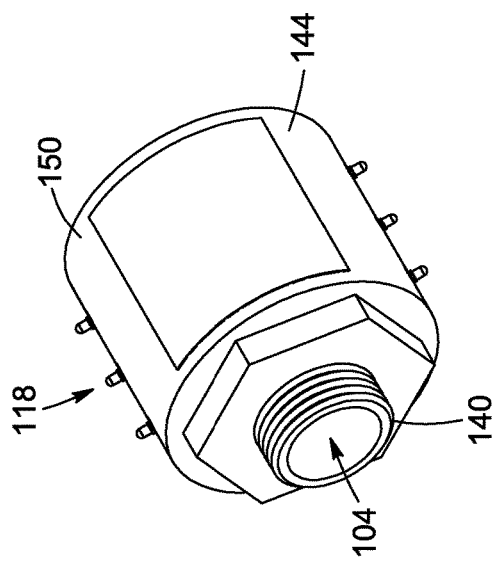

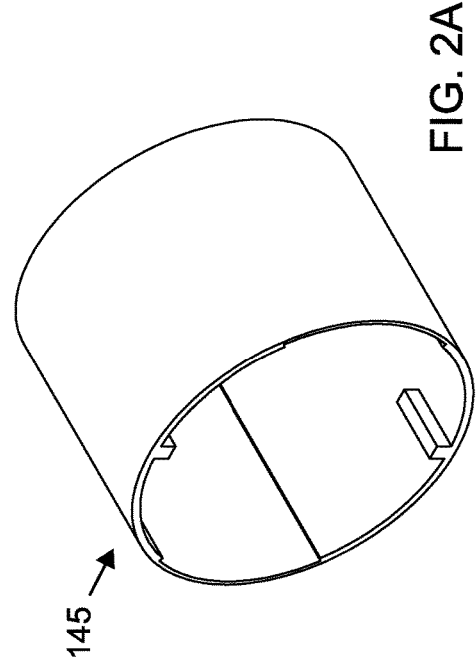
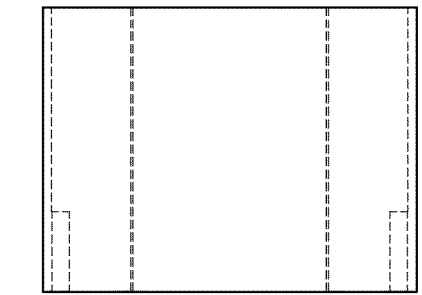
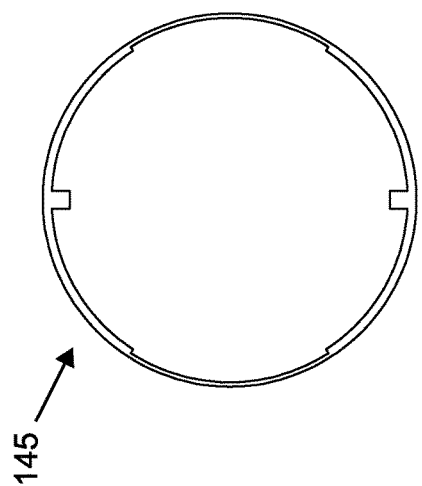
FIG. 2A
FIG. 2C
FIG. 2B

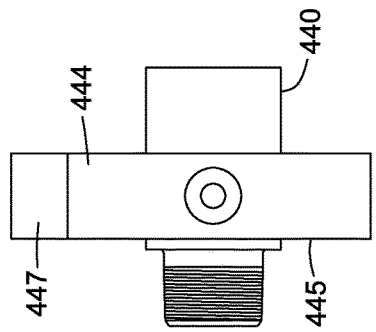
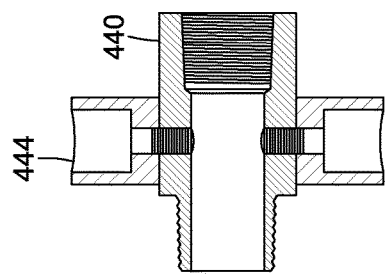
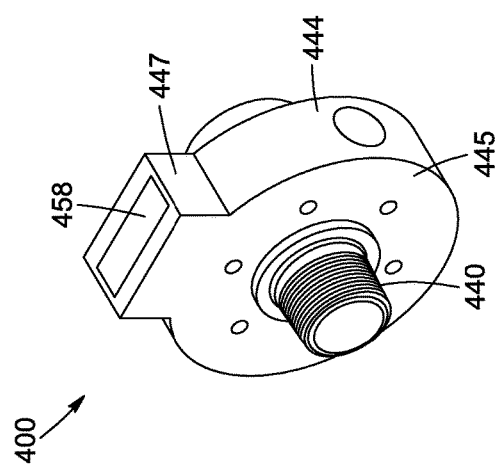

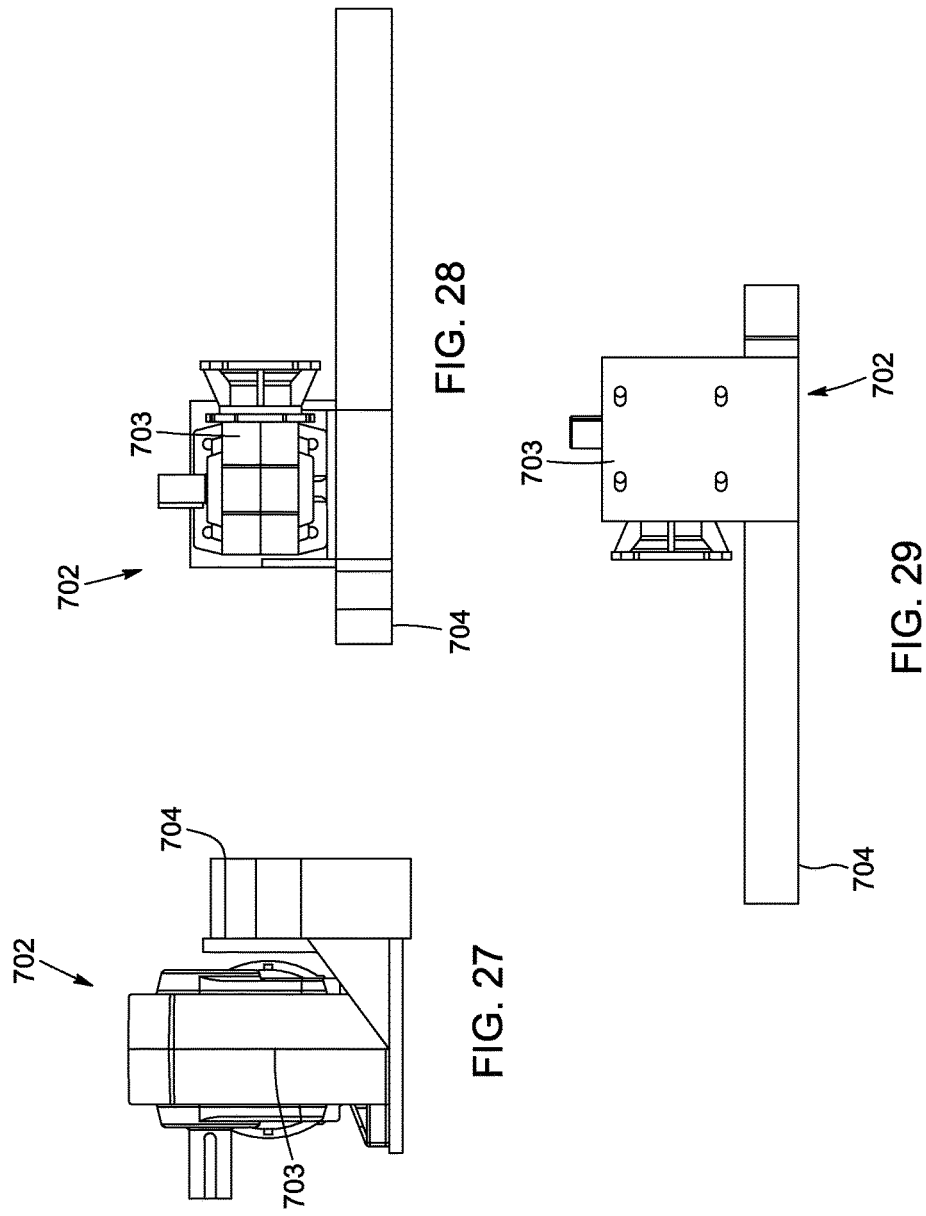

ENHANCED RAILWAY EQUIPMENT AND RELATED INTEGRATED SYSTEMS

CROSS REFERENCE TO RELATED APPLICATIONS

This application claims priority of patent application U.S. 62/433,993 filed on Dec. 14, 2016, the specification of which is hereby incorporated by reference.

BACKGROUND

Related Field

The technical field generally relates to railway equipment for use in freight and hopper cars for enhanced operation and functionality.

Description of Related Art

There are various challenges in the field of railway freight car equipment, for example with respect to train line brake pressure detection, gravity discharge gate operation on hopper cars, and power supply to instrumentation and motorized equipment added onto freight and hopper cars.

BRIEF SUMMARY

Various methods, kits and systems are provided to enhance safety and efficiency of operations, such as train braking and discharging, by means of gravity, commodities from covered hopper cars.

In accordance with one aspect, there is provided a method for indicating brake air pressure status in brake pipes of multiple interconnected train cars, the method including providing at least one end-hose adapter per train car, each end-hose adapter including a housing including opposed ports connectable with a train car end hose and a brake pipe respectively, an exterior surface, and a channel extending between the opposed ports and being in fluid communication with brake air within the brake pipe. Each end-hose adapter also includes a pressure sensor mounted to the housing and extending within the channel, the pressure sensor being configured to sense brake air pressure within the brake pipe and generate a brake air pressure signal and a control unit operatively connected to the pressure sensor to receive the brake air pressure signal, and configured to generate control signals including a first control signal when the brake air pressure signal indicates a brake air pressure above a pre-determined pressure threshold, and a second control signal when the brake air pressure signal indicates a brake air pressure below the pre-determined pressure threshold. The end-hose adapter also includes a light system mounted with respect to the exterior surface of the housing and configured to receive the control signals from the control unit and to display different colors in response to different control signals, and a power source connected to the pressure sensor, the control unit, and the light system to provide power thereto. The method also includes operating each of the end-hose adapters to sense the corresponding brake air pressure within the corresponding brake pipe to which the end-hose adaptor is mounted such that when the brake air pressure in the brake pipe is above the pre-determined pressure threshold, the light system of the end-hose adapter is operated to display a first colour, and when the brake air pressure in the brake pipe is below the pre-determined pressure threshold, the light system of the end-hose adapter is operated to display a second colour indicating air leakage in that brake pipe.

In some embodiments, the control unit is a logic circuit, the first control signal and the second control signal are electrical signals, and the pressure sensor is an electrical pressure sensor.

In some embodiments, the light system includes a plurality of lights mounted to the exterior surface of the housing in spaced-apart relation with respect to each other.

In some embodiments, the lights include light emitting diodes (LEDs).

In some embodiments, the lights are configured such that all of the lights simultaneously display either the first color or the second color.

In some embodiments, the housing includes a primary housing defining the channel and having the opposed ports and the opposed ends thereof, the primary housing including an opening through which part of the pressure sensor extends to be positioned within the channel, and a secondary housing mounted about the primary housing, the lights being mounted with respect to the secondary housing.

In some embodiments, the primary housing includes a cylindrical pipe and a flange extending outward at an end region thereof, the flange being configured to abut against an axial surface of the secondary housing.

In some embodiments, the secondary housing includes molded resin, and wherein part of the lights and part of the pressure sensor are embedded within the molded resin.

In accordance with another aspect, there is provided a method for indicating brake air pressure status in brake pipes of multiple interconnected train cars, the method including operating at least one end-hose adapter per train car, each end-hose adapter being mounted between a train car end hose and a brake pipe to be in fluid communication therewith and being configured to sense the brake air pressure in the brake pipe and provide first visual indication when the brake air pressure is within an operable range and a second visual indication when the brake air pressure is below an operable value and is experiencing leakage.

In some embodiments, each end-hose adapter includes a housing. The housing includes opposed ports connectable with the corresponding train car end hose and the corresponding brake pipe respectively, an exterior surface, a channel extending between the opposed ports and being in fluid communication with brake air within the brake pipe. The end-hose adapter also includes a pressure sensor mounted to the housing and extending within the channel, the pressure sensor being configured to sense the brake air pressure within the brake pipe and generate a brake air pressure signal and a control unit operatively connected to the pressure sensor to receive the brake air pressure signal, and configured to generate control signals. The control signals include a first control signal when the brake air pressure signal indicates a brake air pressure above a pre-determined pressure threshold and a second control signal when the brake air pressure signal indicates a brake air pressure below the pre-determined pressure threshold. The end-hose adapter also includes a light system mounted with respect to the exterior surface of the housing and configured to receive the control signals from the control unit and to display the first and second visual indications in response to different control signals.

In some embodiments, the end-hose adapter further includes a power source including a battery that is operatively connected to the pressure sensor and the light system to provide power thereto and is mounted within the housing.

In some embodiments, the pre-determined pressure threshold is between predetermined pressure levels which range from 25 psi to 75 psi.

In accordance with another aspect, there is provided an end-hose adapter for indicating brake air pressure status in a brake pipe of a train car, the end-hose adapter a housing, a pressure sensor and a light system. The housing includes opposed ports connectable with a train car end hose and a brake pipe respectively, an exterior surface and a channel extending between the opposed ports in fluid communication with brake air within the brake pipe. The pressure sensor is mounted to the housing and extending within the channel, the pressure sensor being configured to sense brake air pressure within the brake pipe and generate a brake air pressure signal. The light system is mounted with respect to the exterior surface of the housing to be visible to a user, the light being configured to receive signals derived from the brake air pressure signal, and in response to the signals display a first color when the brake air pressure in the brake pipe is above the pre-determined pressure threshold, and display a second colour indicating air leakage when the brake air pressure in the brake pipe is below the pre-determined pressure threshold.

In some embodiments, the light system includes a plurality of lights mounted to the exterior surface of the housing in spaced-apart relation with respect to each other.

In some embodiments, the lights are mounted around a radial periphery of the housing or along a longitudinal section of the housing.

In some embodiments, the external surface of the housing includes a plurality of depressions and the lights are at least partially embedded within respective depressions.

In some embodiments, the end-hose adapter further includes a control unit operatively connected to the pressure sensor to receive the brake air pressure signal, the control unit being configured to generate control signals including a first control signal when the brake air pressure signal indicates a brake air pressure above a pre-determined pressure threshold, and a second control signal when the brake air pressure signal indicates a brake air pressure below the pre-determined pressure threshold. The control unit is operatively connected to the light system to provide the control signals thereto to display the first or second color.

In some embodiments, the control unit is a logic circuit, the pressure sensor is an electrical pressure sensor, and the first control signal the second control signal are electrical signals.

In some embodiments, the housing includes a primary housing defining the channel and having the opposed ports and the opposed ends thereof, the primary housing including an opening through which part of the pressure sensor extends to be positioned within the channel, and a secondary housing mounted about the primary housing, the lights being mounted with respect to the secondary housing. The primary housing includes a cylindrical pipe, and the secondary housing is composed of molded resin, and wherein part of the light and part of the pressure sensor are embedded within the molded resin.

In some embodiments, the end-hose adapter further includes a power source operatively connected to the pressure sensor and the light system to provide power thereto.

In some embodiments, the power source includes a battery mounted within the housing.

In some embodiments, the power source further includes a solar panel mounted to part of the external surface of the housing and coupled to the battery for providing power thereto.

In some embodiments, the end-hose adapter further includes a logic circuit operatively connected to the pressure sensor to receive the brake air pressure signal, the logic circuit being configured to generate control signals including a first control signal when the brake air pressure signal indicates a brake air pressure above a pre-determined pressure threshold, and a second control signal when the brake air pressure signal indicates a brake air pressure below the pre-determined pressure threshold. The logic circuit is operatively connected to the light system to provide the control signals thereto to display the first or second color. The end-hose adapter also includes a power source operatively connected to the pressure sensor and the light system to provide power thereto. The housing includes a primary housing defining the channel and having the opposed ports and the opposed ends thereof, the primary housing including an opening through which part of the pressure sensor extends to be positioned within the channel, and a secondary housing mounted about the primary housing, wherein the lights, the power source and the logic circuit are mounted with respect to the secondary housing.

In some embodiments, the power source, part of the light system, and the logic circuit are embedded within the secondary housing that includes a molded body.

In accordance with another aspect, there is provided a method for indicating brake air pressure status in brake pipes of multiple interconnected train cars. The method includes a step of providing at least one end-hose adapter per train car. Each end-hose adapter includes a housing, a pressure sensor, a control unit, a light system and a power source. The housing includes opposed ports connectable with a train car end hose and a brake pipe respectively, an exterior surface, and a channel extending between the opposed ports and being in fluid communication with brake air within the brake pipe. The pressure sensor is mounted to the housing and extends within the channel. The pressure sensor is configured to sense brake air pressure within the brake pipe and generate a brake air pressure signal. The control unit is operatively connected to the pressure sensor to receive the brake air pressure signal, and configured to generate control signals. The control signals include a first control signal and a second control signal: the first control signal when the brake air pressure signal indicates a brake air pressure above a pre-determined pressure threshold, and the second control signal when the brake air pressure signal indicates a brake air pressure below the pre-determined pressure threshold. The light system is mounted with respect to the exterior surface of the housing and configured to receive the control signals from the control unit and to display different colors in response to different control signals. The power source is connected to the pressure sensor, the control unit, and the light system to provide power thereto. The method also includes a step of operating each of the end-hose adapters to sense the corresponding brake air pressure within the corresponding brake pipe to which the end-hose adaptor is mounted such that when the brake air pressure in the brake pipe is above the pre-determined pressure threshold, the light system of the end-hose adapter is operated to display a first colour, when the brake air pressure in the brake pipe is below the pre-determined pressure threshold, the light system of the end-hose adapter is operated to display a second colour indicating air leakage in that brake pipe.

In some embodiments, the control unit is a logic circuit.

In some embodiments, at least one of the first control signal and the second control signal is an electrical signal.

In some embodiments, the first control signal and the second control signal are electrical signals.

In accordance with another aspect, there is provided a method for indicating brake air pressure status in brake pipes of multiple interconnected train cars. The method includes operating at least one end-hose adapter per train car, each end-hose adapter being mounted between a train car end hose and a brake pipe to be in fluid communication therewith and being configured to sense the brake air pressure in the brake pipe and provide first visual indication when the brake air pressure is within an operable range and a second visual indication when the brake air pressure is below an operable value and is experiencing leakage.

In accordance with another aspect, there is provided a method for indicating brake air pressure status in brake pipes of multiple interconnected train cars. The method includes monitoring brake air pressure in the brake pipe of each train car, and providing a visual indication at a visible location of each brake pipe of the corresponding brake air pressure status, wherein for each brake pipe: when the brake air pressure in the brake pipe is within an operable pressure range, the visual indication comprises a first light emission, and when the brake air pressure in the brake pipe is below the operable pressure range, the visual indication comprises a second light emission that is different from the first light emission.

According to another aspect, there is provided a kit for indicating brake air pressure status in brake pipes of multiple interconnected train cars. The kit includes at least one end-hose adapter. Each one end-hose adapter kit includes a housing, a pressure sensor, a control unit, a light system and a power source. The housing includes opposed ports connectable with a train car end hose and a brake pipe respectively, an exterior surface, and a channel extending between the opposed ports and capable of being in fluid communication with brake air within the brake pipe when the opposed ports are mounted to the train car end hose and the brake pipe. The pressure sensor is mountable to the housing for extending within the channel, the pressure sensor being capable of sensing brake air pressure within the brake pipe and generating a brake air pressure signal. The control unit is operatively connectable to the pressure sensor to receive the brake air pressure signal, and configured to generate control signals. The control signals include a first control signal when the brake air pressure signal indicates a brake air pressure above a pre-determined pressure threshold, and a second control signal when the brake air pressure signal indicates a brake air pressure below the pre-determined pressure threshold. The light system is mountable with respect to the exterior surface of the housing and configurable to receive the control signals from the control unit and to display different colors in response to different control signals. The power source is connectable to the pressure sensor, the control unit, and the light system to provide power thereto.

In some embodiments, the control unit is a logic circuit.

In some embodiments, at least one of the first control signal and the second control signal is an electrical signal.

In some embodiments, the first control signal and the second control signal are electrical signals.

According to another aspect, there is provided an end-hose adapter for indicating brake air pressure status in a brake pipe of a train car. The end-hose adapter includes a housing, a pressure sensor and a light system. The housing includes opposed ports connectable with a train car end hose and a brake pipe respectively, an exterior surface, and a channel extending between the opposed ports in fluid communication with brake air within the brake pipe. The pressure sensor is mounted to the housing and extending within the channel, the pressure sensor being configured to sense brake air pressure within the brake pipe and generate a brake air pressure signal. The light system is mounted with respect to the exterior surface of the housing to be visible to a user, the light being configured to receive signals derived from the brake air pressure signal, and in response to the signals display a first color when the brake air pressure in the brake pipe is above the pre-determined pressure threshold, and display a second colour indicating air leakage when the brake air pressure in the brake pipe is below the pre-determined pressure threshold.

In some embodiments, the light system comprises a plurality of lights mounted to the exterior surface of the housing.

In some embodiments, the lights are mounted in spaced-apart relation with respect to each other.

In some embodiments, the lights are mounted around a radial periphery of the housing.

In some embodiments, the lights are mounted along a longitudinal section of the housing.

In some embodiments, the external surface of the housing includes a plurality of depressions and the lights are at least partially embedded within respective depressions.

In some embodiments, the depressions and the lights are sized and configured such that outer surfaces of the lights are generally flush with adjacent regions of the external surface of the housing.

In some embodiments, the depressions and the lights are sized and configured such that the lights partially protrude from the respective depressions.

In some embodiments, the lights are mounted to face radially outward.

In some embodiments, the lights are mounted to face axially.

In some embodiments, the lights include light emitting diodes (LEDs).

In some embodiments, the lights are configured such that all of the lights simultaneously display either the first color or the second color.

In some embodiments, the lights include first and second sets of the lights that are configured such that: when the brake air pressure in the brake pipe is above the pre-determined pressure threshold, the first set of the lights displays the first color and the second set of the lights turns off, and when the brake air pressure in the brake pipe is below the pre-determined pressure threshold, the second set of the lights displays the second color and a first set of the lights turns off.

In some embodiments, the light system is configured such that the first color is red and the second color is green.

In some embodiments, the end-hose adapter further includes a control unit. The control unit is operatively connected to the pressure sensor to receive the brake air pressure signal, the control unit being configured to generate control signals including a first control signal when the brake air pressure signal indicates a brake air pressure above a pre-determined pressure threshold, and a second control signal when the brake air pressure signal indicates a brake air pressure below the pre-determined pressure threshold. The control unit is operatively connected to the light system to provide the control signals thereto to display the first or second color.

In some embodiments, the control unit is a logic circuit.

In some embodiments, at least one of the first control signal and the second control signal is an electrical signal.

In some embodiments, the first control signal and the second control signal are electrical signals.

In some embodiments, the housing includes a primary housing and a secondary housing. The primary housing defines the channel and has the opposed ports and the opposed ends thereof. The primary housing includes an opening through which part of the pressure sensor extends to be positioned within the channel. The secondary housing is mounted about the primary housing, the lights being mounted with respect to the secondary housing.

In some embodiments, the primary housing includes a cylindrical pipe.

In some embodiments, the primary housing further includes a flange extending outward at an end region thereof, the flange being configured to abut against an axial surface of the secondary housing.

In some embodiments, the secondary housing is composed of molded resin, and wherein part of the light and part of the pressure sensor are embedded within the molded resin.

In some embodiments, the molded resin includes epoxy.

In some embodiments, the opposed ports respectively comprise male and female threaded portions for attachment to the car end hose and the brake pipe.

In some embodiments, the secondary housing has a generally cylindrical outer surface.

In some embodiments, the end-hose adapter further includes a power source operatively connected to the pressure sensor and the light system to provide power thereto.

In some embodiments, the power source comprises a battery.

In some embodiments, the battery is mounted within the housing.

In some embodiments, the power source further includes a solar panel mounted to part of the external surface of the housing and coupled to the battery for providing power thereto.

In some embodiments, the power source includes a solar panel.

In some embodiments, the end-hose adapter further includes a control unit and a power source. The control unit is operatively connected to the pressure sensor to receive the brake air pressure signal, the control unit being configured to generate control signals including a first control signal when the brake air pressure signal indicates a brake air pressure above a pre-determined pressure threshold, and a second control signal when the brake air pressure signal indicates a brake air pressure below the pre-determined pressure threshold. The control unit is operatively connected to the light system to provide the control signals thereto to display the first or second color. The power source is operatively connected to the pressure sensor and the light system to provide power thereto. The housing includes a primary and a secondary housing. The primary housing defines the channel and has the opposed ports and the opposed ends thereof, the primary housing including an opening through which part of the pressure sensor extends to be positioned within the channel. The secondary housing is mounted about the primary housing, wherein the lights, the power source and the control unit are mounted with respect to the secondary housing.

In some embodiments, the control unit is a logic circuit.

In some embodiments, at least one of the first control signal and the second control signal is an electrical signal.

In some embodiments, the first control signal and the second control signal are electrical signals.

In some embodiments, the power source, part of the light system, and the control unit are embedded within the secondary housing that comprises a molded body.

In some embodiments, the lights, the power source and the control unit are positioned against an outer surface of the primary housing.

In some embodiments, the pressure sensor is electronic.

In some embodiments, the pressure sensor is mechanical.

In some embodiments, multiple pressure sensors are provided extending within the channel.

In some embodiments, the pressure sensor extends transversely into the channel with respect to a longitudinal axis of the channel.

In some embodiments, the pre-determined pressure threshold is between predetermined pressure levels.

In some embodiments, the pre-determined pressure levels range from 20 psi to 75 psi.

In some embodiments, wherein the pre-determined pressure levels range from 25 psi to 75 psi.

In some embodiments, the pre-determined pressure levels range from 30 psi to 70 psi.

In some embodiments, the light system is provided to display a third visual indication when the brake air pressure in the brake pipe is below a low-end value, and the second color is indicated when the brake air pressure in the brake pipe is above the low-end value and below the pre-determined pressure threshold.

In some embodiments, the light system is configured to display a third color or no light when the brake air pressure in the brake pipe is detected below the low-end value.

In some embodiments, the low-end value is 20 psi.

In some embodiments, the end-hose adapter further includes a wireless signal generator connected to the housing and being configured to send wireless signals based on the brake air pressure signal to a wayside receiver.

In accordance with another aspect, there is provided a method for manufacturing end-house adapters. The method includes a step of locating a pipe within a cavity of a mold, the pipe being a primary housing and including opposed ends adapted for connection to an end hose and a brake pipe of a train car, an internal channel defined by pipe walls, and an opening through the pipe wall thereof. The method also includes a step of introducing instrumentation within the cavity of the mold and outside of the pipe, the instrumentation including a pressure sensor introduced through the opening of the pipe so that a pressure sensing tip is located within the internal channel, a light system, a control unit, a power source, wire connections for inter-connecting the pressure sensor, the control unit, the power source, and the light system, to enable signal communication from the pressure sensor to the light system such that the light system can display visual indications in response to brake air pressure detected in the brake pipe by the pressure sensor. The method also includes steps of introducing an epoxy material into the cavity of the mold, thereby embedding the instrumentation within the epoxy, curing the epoxy to form a secondary housing coupled to the primary housing which together form the end-hose adapter, and removing the end-hose adapter from the mold.

In some embodiments, the light system includes light-emitting diodes (LEDs).

In some embodiments, the control unit is a logic circuit.

In some embodiments, the method includes a step of molding resin to for the secondary housing.

In some embodiments, the method includes a step of metal casting the pipe forming the primary housing.

In accordance with another aspect, there is provided a car end-hose adapter for indicating brake pipe leakage in freight cars. The car end-hose adapter can include an adapter having male and female threaded ends for attachment to the car end hose and to the air brake train line respectively. The adapter is configured to facilitate detection of excessive air leaks, and thus low train line pressure, on either end of individual freight cars by measuring the air flow at both ends of a freight car. The primary housing can be a pipe or another tubular structure that defines a channel into which pressure transducers protrude. In some implementations, a secondary housing is coupled to the primary housing and houses lights (e.g., LEDs), rechargeable batteries, and electronics, which are connected to the pressure transducers. The pressure transducers measure air brake pressure and send a signal so that the LED lights indicate status of the brakes. The battery can be powered by a solar panel that is provided on the exterior of the secondary housing or elsewhere on the adapter or the car.

In accordance with another aspect, there is provided enhancement techniques to be used for gravity discharge gates on hopper cars. A bubble-lock mechanism can also be provided for use in hopper cars equipped with bubble-lock gates. The bubble-lock gate can have two-piece rotating gate doors as opposed to a one-piece horizontal gate door. The bubble-lock mechanism includes two opposed flexible housings that have a profile having a "bubbled" or a "polygonal" shape, forming either "bubbled" or "polygonal" portions and necks. In some embodiments, the profile has "triangular" pointed portions and necks. The flexible plates can be made of spring steel. The bubble-lock secures the rotating plate, which is attached to the gates through links, in locked position. Extension rods on the rotating plates pass through multiple necks of the "bubble" or "polygonal" lock, which either of the two profile designs act as intermediate stages of gate door securement, until the gate is fully open or closed.

In accordance with another aspect, there is provided a bubble-lock mechanism or a polygonal-lock for hopper cars equipped with bubble-lock or polygonal-lock gates. The bubble-lock or polygonal-lock mechanism includes two rotating plates for unloading commodities transported by the hopper cars when being rotated. The bubble-lock or polygonal-lock mechanism also includes two opposed housings, and each one of the two opposed housings defines a profile having a bubbled or a polygonal shape, the bubble or polygonal shape defining successive bubble or polygonal, and neck portions. The bubble-lock or polygonal-lock also includes an extension rod extending above the two rotating plates and through the two opposed housings, and selectively interlocking with one of the successive bubble or polygonal and neck portions of each one of the two opposed housings. The extension rod is connected to the two rotating plates for rotating the two rotating plates from a closed configuration to an open configuration when the extension rod is engaged with a subsequent one of the successive bubble or polygonal and neck portions of each one of the two opposed housings, thereby allowing to discharge the commodities transported by the hopper cars.

In accordance with another aspect, there is provided techniques for motorizing the operation of the gravity discharge gate, which can be facilitated by providing a motorized drive system integrated into a covered hopper car. A motor can be mounted and engaged at the capstan of the drive shaft of the hopper gate, and can be operated to open and close the gates. The power source to operate the motors in the field can be a solar-based source, where solar panels are integrated into one or more components or on the car itself. In some implementations, a solar energy network is used to power various pieces of equipment, such as the motorized drive shaft for the gravity discharge gate, the end-hose adapter, among others, while the bubble-lock system enhances the gravity discharge gate operation.

One or more of the abovementioned system(s) can be powered using solar panels that are attached to the cars, to the systems and/or to associated equipment, thereby integrating a reliable and environmental source of energy.

Other features will be better understood upon reading of embodiments thereof with reference to the appended drawings.

BRIEF DESCRIPTION OF THE FIGURES

FIGS. 1A-G illustrate different views of an end-hose adapter for indicating brake air pressure status in brake pipes of multiple interconnected train cars, in accordance with an embodiment.

FIGS. 2A-C illustrate different views of a cover for a secondary housing, in accordance with an embodiment.

FIGS. 9A-9C show an end-hose adapter for indicating brake air pressure status in brake pipes of multiple interconnected train cars, in accordance with another embodiment.

FIG. 27 is a back view of a motorized drive shaft system.
FIG. 28 is a top view of a motorized drive shaft system.
FIG. 29 is a bottom view of a motorized drive shaft system.

DETAILED DESCRIPTION OF VARIOUS EMBODIMENTS

Figure 1E:
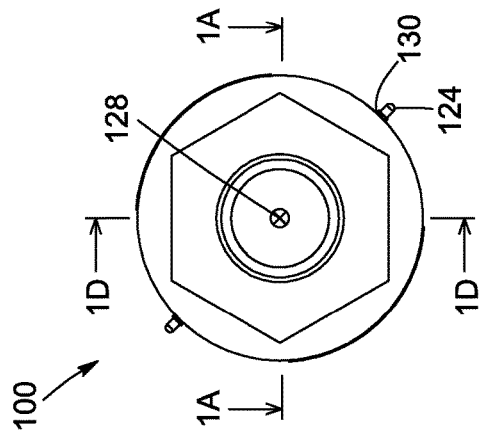
Figure 1G:
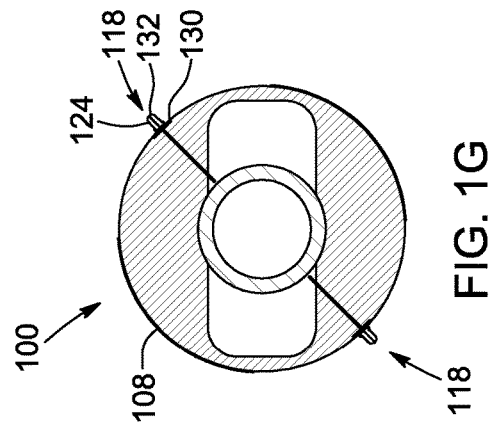
Figure 1D:
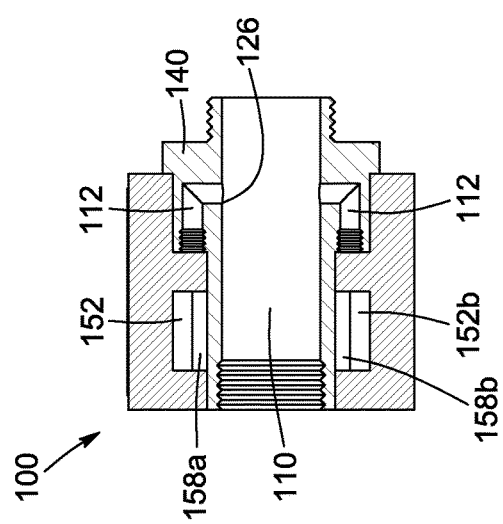
Figure 1F:
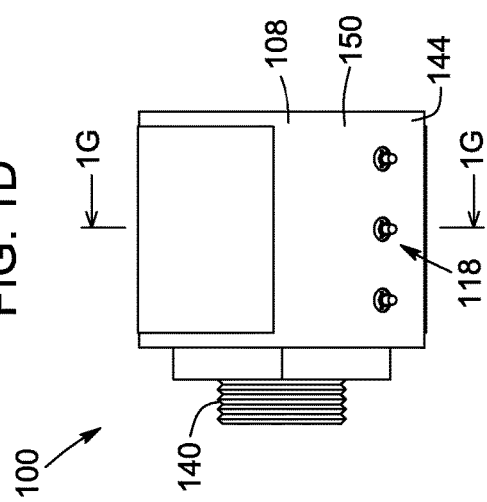

In the following description, similar features in the drawings have been given similar reference numerals. In order to not unduly encumber the figures, some elements may not be indicated on some figures if they were already mentioned in preceding figures. It should also be understood herein that the elements of the drawings are not necessarily drawn to scale and that the emphasis is instead being placed upon clearly illustrating the elements and structures of the present embodiments.

The North American railroad industry allows two methods to be used as part of the train qualification criteria, prior to initial terminal departure of a train from the yards, namely: brake pipe leakage method or air flow method. All trains must meet the operating requirement of a maximum brake pipe gradient of 15 psi to ensure that a sufficient amount of braking capability is available to safely operate a train. Methods, kit, apparatus, equipment and integral systems for railway applications meeting such an operating requirement are described herein.

More particularly, different implementations of the apparatuses, kits, methods and processes described herein can be used for indicating air pressure status in brake pipes of multiples interconnected train cars, and can be adapted to a broad variety of applications. The use of the disclosed apparatus and kit facilitates enhancing safety and efficiency of operations in freight cars.

Broadly described, a method and an end-hose adapter for indicating brake air pressure status in brake pipes of multiple interconnected train cars can be advantageously implemented. The method generally includes two general steps, the first being monitoring brake air pressure in the brake pipe of each train car, and the second being providing a visual indication at a visible location of each brake pipe of the corresponding brake air pressure status. The method permits, for each train car, to indicate when the brake air pressure in the brake pipe is within or below an operable pressure range. The visual indication can comprise a first light emission to indicate that the brake air pressure is within the pressure range, and a second light emission that is different from the first light emission to indicate that the brake pressure is below the pressure range. Example end-hose adapters described herein facilitate permit implementing such method.

End-Hose Adapter for Indicating Brake Air Pressure Status in Brake Pipes of Multiple Interconnected Train Cars Broadly described, the end-hose adapter is a system that is configured for attachment at one end to the end of a freight car end-hose and at the other end to the train line (i.e., the brake pipe). For example, the end-hose adapter can accurately measure the train line pressure and, through a light system (e.g., an LED diode light emission system, as it will be described in detail below), can indicate if the train line pressure at either end of a car, or at both ends of two cars (or more) coupled together, has low, high or normal pressure. The end-hose can thereby detect and indicate cars with excessive air leakage or other anomalies (e.g., a pressure value that may deviate from what is standard or considered normal under specific operating conditions). In some embodiments, the indication is such that the end-hose adapter has the capability of communicating with the railroad way-side detectors or remote detectors, for example provided at train station or on the train itself, so that freight car(s) experiencing excessive air leakage are identified automatically and bad-actor cars are set off for examination and repair of brake pipe air leaking areas.

Referring to FIGS. 1A-G, an end-hose adapter 100 for indicating brake pipe leakage in freight cars is illustrated. As mentioned, embodiments of the end-hose adapter 100 can facilitate detection of excessive air leaks, and thus low train line pressure on either end of individual freight cars by measuring the air pressure at both ends of a freight car. The end-hose adapter 100 can also be useful for the detection of excessive air leaks of two cars coupled together by measuring the air pressure at both ends of cars coupled together, identification of freight car ends with low air pressure indicating excessive air leaking on that particular car via a lighting system, and/or power supply enhancements for powering certain components of the end-hose adapter.

In some embodiments, the end-hose adapter 100 is referred to as "SMART™ adapters" (Instrumented Measuring Air Pressure Transducer).

As it will be described in detail in the following sections, the end-hose adapter 100 typically includes a housing 102, a pressure sensor 112, a control unit 114, a light system 118 and a power source 120.

Housing

As illustrated, the housing 102 includes opposed ports 104, 106, each being connectable with a train car end-hose and a brake pipe, respectively.

The housing 102 has an exterior surface 108 resembling to an outer surface of a cylinder. Indeed, as illustrated, the exterior surface 108 defines an overall cylindrical outer surface, and has a substantially circular cross-section. It will however be easily understood that the shape of the exterior surface 108 of the housing 102 may vary according to certain applications or design constraints (e.g., available space or positioning of the end-hose adapter 100). The diameter of the circular cross-section can vary. In some embodiments, the diameter ranges from 5 inches or less.

The housing 102 has a channel 110 for air flow. The channel 110 extends between the opposed ports 104, 106 to allow a fluid (e.g., air) to flow therein. As such, when installed on the freight trains, the channel 110 is in fluid communication with brake air within the brake pipe, through the ports 104, 106.

In some embodiments, the primary housing 140 can be a pipe 146 with male and female threaded ends 105, 107 or can have another type of tubular-like structure or a construction that defines a channel providing fluid communication between the two opposed ports 104, 106. The channel 110 becomes in fluid communication with the train line and the car end hose after connection thereto.

As it has been previously mentioned, the end-hose adapter 100 includes at least one pressure sensor. Now turning to FIG. 1D, the pressure sensor 112 is illustrated. More particularly, holes are provided (e.g., tapped, punched or drilled) through the pipe 146 wall of the primary housing 140 to accept the pressure sensor 112. In some implementations, the tip of the pressure sensor extend into the air flow section (i.e., within the channel 110 of the primary housing 140) to be able to measure the train line pressure. There may be a single pressure sensor 112 per end-hose adapter 100 or there may be multiple pressure sensors 112 around a radial periphery 126 of the primary housing 140, or along a longitudinal length thereof. When multiple pressure sensors 112 are used, their respective tips can extend to a similar distance relative to the inner surface of the pipe 146 walls or different distances. In the latter case, for instance, some of the tips can extend in a region near the center of the channel 110, while other tips extend in a peripheral region of the channel 110. Such configuration can be useful, for example, for ensuring the uniformity of the pressure measurements within the channel 110, which is turn can be used to monitor abnormal pressure drop in a portion of interest in the channel 110 (e.g., the brake pipe is damages in the peripheral region of the channel 110, and so the pressure in the neighborhood of the hole is less than in the central portion of the channel 110).

More particularly, in the illustrated embodiment, the pressure sensor 112 includes two pressure transducers. The pressure transducers are mounted to the housing 102 and in fluid communication with the channel 110. Alternatively, and as better seen in FIG. 3, the pressure sensor 112 can extend within the channel 110. In such configurations (i.e., being in fluid communication or extending directly in the channel 110), the pressure sensor 112 is configured to sense brake air pressure within the brake pipe, and generate a corresponding brake air pressure signal, as it will be explained in greater detail below.

The housing 102 is also configured to allow a light system 118 to be mounted thereon or therein.

Figure 3:
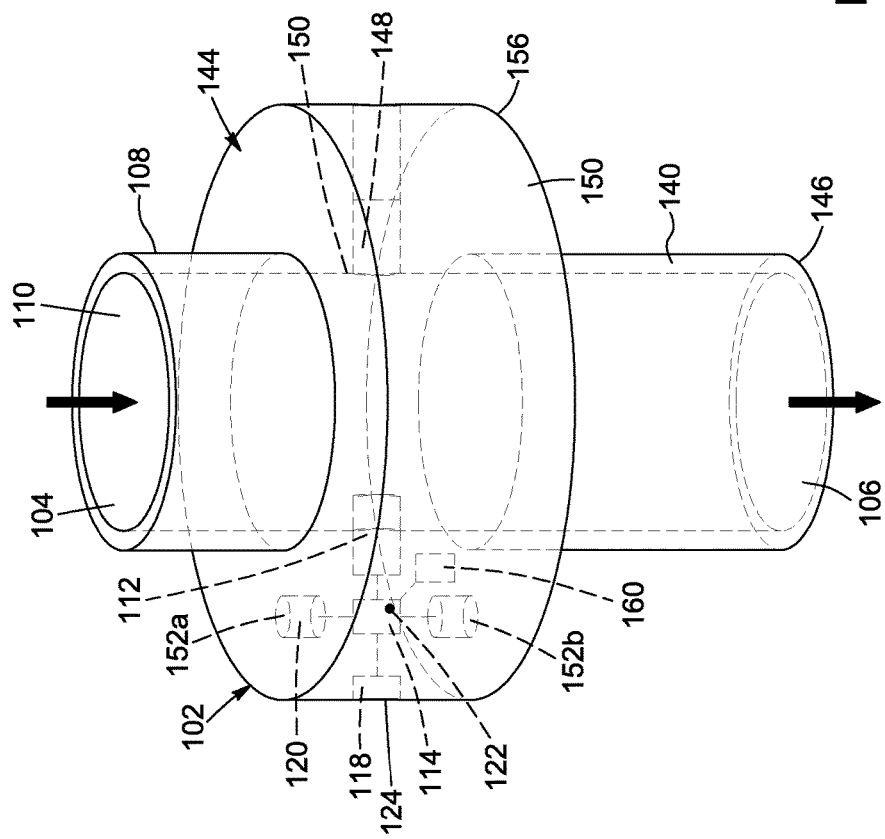
FIG. 3 shows an end-hose adapter for indicating brake air pressure status in brake pipes of multiple interconnected train cars, in accordance with another embodiment.
Figure 4:
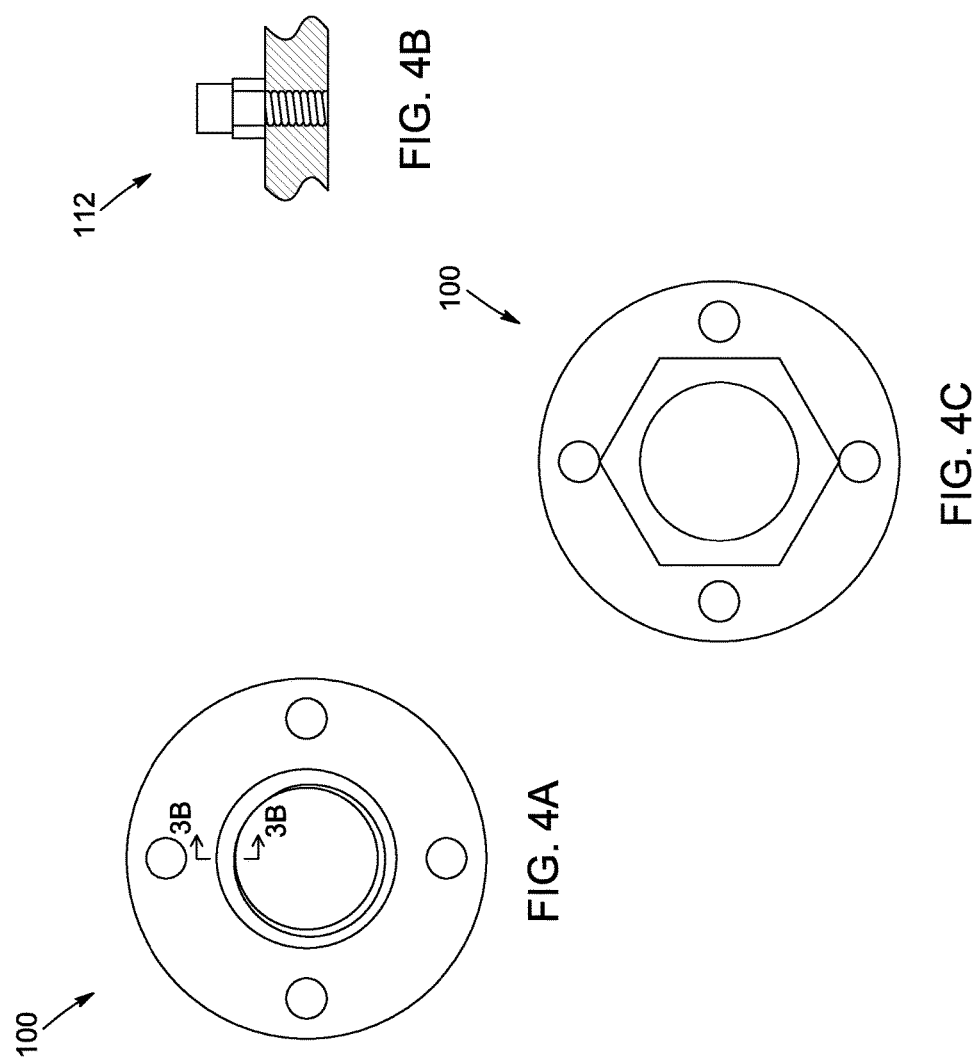
FIGS. 4A-C are different views of an end-hose adapter for indicating brake air pressure status in brake pipes of multiple interconnected train cars and of a pressure sensor, in accordance with another embodiment.

As illustrated, for example, on FIGS. 1 to 3, the light system 118 can be mounted with respect to the exterior surface 108 of the housing 102, in order to be visible to a user (i.e., an operator) or, in some embodiments, to be detectable by corresponding detectors.

It will be further described that the light system 118 is configured to receive signals derived from a brake air pressure signal, and in response to the signals, displays predetermined color associated with a state of the brake line. For example, a first predetermined color could be associated to a state in which the brake air pressure in the brake pipe is above a predetermined pressure threshold, and a second predetermined color could be displayed for indicating, for example, an air leakage when the brake air pressure in the brake pipe is below the pre-determined pressure threshold.

Still referring to FIGS. 1 to 3, in some embodiments, the end-hose adapter 102 includes a primary housing 140. The channel 110 extends throughout the primary housing 140 from one of its end to another one of its end.

As for the materials forming the primary housing 140, the primary housing 140 can be made of steel in compliance with the American Association of Railroads (AAR) air brake system materials standards, or any other alloys meeting the AAR standards. Generally speaking, the primary housing 140 is made from a rust-resistant material or materials that can resist or at least being minimally damages by the severe weather.

From a structural point of view, the end-hose adapter 100 is provided with a female thread 107 at one end (e.g. at or near the port 106) to attach to the car end hose and has a male threaded end 105 at the other end (i.e., near or at the port 104), to attach to the car train line. Various constructions can be used on the opposed ends 105, 107 of the primary housing 140 to connect the adapter 100 to the end hose and train line. For example, in alternate embodiments, each end could be provided with a mechanical fastener, such as a snap-lock mechanism or the like.

The end-hose adapter 100 also includes a secondary housing 144. As illustrated, the secondary housing 144 is annular and defines a central opening in which the primary housing 140 is received. The secondary housing 144 also has a substantially cylindrical shape, but is dimensioned so as its central opening can receive the primary housing 140 therein. As such, the diameter of the primary housing 140 is typically substantially equal to the nominal diameter of the secondary housing 144. In this context, the term "nominal diameter" refers to the dimension of the central opening in the secondary housing 144. Alternatively, the nominal diameter of the secondary housing 144 may be slightly bigger that the diameter of the first housing 140. In such circumstances, the secondary housing 144 or a portion of its internal volume can be filled with epoxy, a seal, or other suitable materials to make the secondary housing 144 a solid unit around the primary housing 140 of the adapter 100. Other suitable materials include, but are not limited to other curable adhesives that may be thermally and chemically resistant. The secondary housing 144 can be viewed as the instrumented portion of the end-hose adapter 100, and can be attached to the primary housing 140 while being removable and replaceable, for example via connectors such as screws and the like. The first and secondary housing 140, 144 can alternatively be constructed to have an integral one-piece structure made of the same material. The secondary housing 144 can also be referred to as a "cover". It is to be noted that the secondary housing 144 can be provided with a substantially transparent cover, such as the one depicted in FIGS. 2A-C. In FIGS. 2A-C, a cover 145 is shown. The cover 145 is configured and shaped for receiving the secondary housing 144 therein.

In terms of manufacturing, as it will be further detailed, the components provided in the end-hose end adapter 100 can be placed in a mold (not illustrated here) and a resin or other curable material (e.g., epoxy) can be provided to fill the mold such that the above-mentioned components are embedded therein. The components can be embedded in a molded epoxy that forms the secondary housing 144, or the secondary housing 144 can be molded (again, out of epoxy for example) such that openings are provided so that the components can be inserted for operation. The mold can include two halves and can be injected with epoxy or another type of material, and when the two halves of the mold are removed it can form a cylindrical housing.

As better illustrated in FIG. 3, the secondary housing 144 can include a shell or casing 156 for enclosing various components and what will be referred to as "instrumentation", i.e., one or more power supplies (e.g., batteries), a control unit 114 (e.g., including a circuit board), and pressure taps/transducers. It is noted that the power supply can be configured to include solar panels (not shown in FIG. 8), and lines connecting the solar panels to the other components of the end-hose adapter requiring power. It is to be noted that the "instrumentation" can also be referred to as "system components", and that those two terms will be used interchangeably.

In some embodiments, the secondary housing 144 is made of a plastic material. Alternatively, the secondary housing 144 or a portion thereof could be made of any other material. For example, the secondary housing 144 can be made of a steel to withstand the severe winter conditions. In such an example, the steel can be a steel casting filled with an epoxy material. The system components and the instrumentation can be placed within the steel casting and fixed with the epoxy material.

In addition, it should be noted that there may be a single secondary housing 144 that is mounted about the primary housing 140, or there may be multiple distinct secondary housings mounted about a single primary housing 140. For example, multiple secondary housings can be mounted where they are in spaced apart relation to each other along a length of the primary housing 140. Multiple secondary housings can be used for enabling different functionalities for each secondary housing (e.g., to indicate different pressure levels, to indicate other parameters of the air flow) and/or for facilitating replacement and redundancy. Furthermore, multiple secondary housings may be used such that a first one has certain instrumentation components and the other one has different instrumentation components that may be connected to the first. Such a configuration can be useful in the context of measuring different properties of the fluid, or providing a reliable system.

In some implementations, flexible solar power panels (not illustrated in FIGS. 1-3) are provided on the first and/or secondary housing 140, 144. In some variant, the flexible solar panels are provided on or along the circumference of the secondary housing 144. Such panels can be configured to continuously charge one or more batteries, which in turn can be used to power the control unit 114, or any other components provided in the car end-hose adapter 100.

Referring to FIG. 3, the secondary housing 144 can also include at least one light (e.g., LED) and preferably multiple lights that are distributed around the periphery of the secondary housing. The casing of the secondary housing 144 can have an annular disk shape and can include two opposed ends and a side wall there-between. The lights can be distributed around the side wall, and can have an exposed light emitting part and an interior part that is connected to other components within the casing. The secondary housing also includes at least one power supply unit (e.g., battery), which may be provided on one or both the ends of the casing. The power supply units can be removable and replaceable.

In one implementation, the primary housing 140 includes a cylindrical pipe 146. In this implementation, the primary housing 140 further includes a flange 148 extending outward at an end region thereof. The flange 148 is configured to abut against an axial surface 150 of the secondary housing 144. The secondary housing 144 can be composed of molded resin, and part of the light system 118 and/or part of the pressure sensor 112 are embedded within the molded resin. In some embodiments, the molded resin includes epoxy.

The housing 102 of the end-hose adapter 100 having been described in detail, the various components provided in or on the housing 102, and notably the instrumentation, will now be presented.

Pressure Sensor

Amongst other components, the instrumentation includes a pressure sensor 112. One embodiment of the pressure sensor 112 is illustrated in FIGS. 1 and 3. The pressure sensor 112 is configured for measuring pressure in fluids (i.e., gas or liquid, preferably air), and can be embodied by one or more pressure transducer(s). The pressure sensor 112 generates one or more signal(s) as a function of the pressure measured. The signal(s) generated can be, for example, an electrical signal. While the pressure sensor 112 could be configured for measuring other properties of the fluid in the brake line, such as and without being limitative, fluid flow, speed, composition and/or the like, the pressure sensor 112 is minimally configured to detect a change in pressure in a predetermined zone. In the context of the present description, the pressure sensor 112 measures the pressure near or at the end-hose adapter 100.

As for its positioning, the pressure sensor 112 is positioned so as to be in fluid communication with the fluid (e.g., the gas) in the brake line of the train. As such, the pressure sensor 112 can be directly or indirectly in contact with the channel 110. In the first case, the pressure sensor 112 is provided extending within the channel 110, i.e., protrudes in the channel 110. In the latter case, the pressure sensor 112 can be provided in chamber(s) adjacent to the channel 110. The adjacent chamber(s) are in fluid communication with the channel 110, and so the pressure in such adjacent chamber(s) is similar or equal to the pressure in the channel 110.

In some embodiments, the pressure sensor 112 extends transversely into the channel 110 with respect to a longitudinal axis of the channel 110, i.e., in a direction substantially perpendicular to the air flow within the brake line of the train. Alternatively, the pressure sensor 112 can extend at various oblique angles into the channel. The tip of the pressure sensor can be located proximate the side wall of the channel, or can be closer or at the middle of the channel, for example.

It will be readily understood that the pressure sensor 112 can be embodied by many different types of pressure sensors or devices. For example, the pressure sensor 112 can be based on different types of pressure measurement, and so can be an absolute pressure sensor, a gauge pressure sensor, a differential pressure sensor or a sealed pressure sensor. The choice of the pressure sensor 112 to be used can be influenced, for example, by the range of pressures to be measured, the operation conditions (e.g., temperature) and/or its compatibility with other components provided with the end-hose adapter 100. In some embodiments, the pressure sensor 112 is electronic. In other embodiments, the pressure sensor 112 is mechanical.

In some embodiments, the pressure sensor 112 measures the gauge air pressure in the brake line. The "pressure gradient", in the context of the present description, is understood as the acceptable pressure drop, due to air leak, in the brake line (e.g., 75 psi minimum pressure required). At the head end of a train, the brake line pressure may be different, and substantially equal to 90 psi.

The predetermined pressure threshold is defined to meet the operating requirement of the maximum brake pipe gradient. In some context, it can be useful that the predetermined pressure threshold is characterized by a range of pressure levels. For example, in some embodiments, the pre-determined pressure levels ranges from 20 psi to 75 psi. In other embodiments, wherein the pre-determined pressure levels range from 25 psi to 75 psi. In some other embodiments, the pre-determined pressure levels range from 30 psi to 70 psi. It will be readily understood that these ranges are provided for exemplary purposes only, and so can vary depending on the requirements to be met and/or the targeted applications. While the predetermined pressure levels typically range from approximately 20 psi to approximately 75 psi, the pressure sensor 112 can be configured to be operable at different levels, for example, 0 psi to 100 psi.

Control Unit

As illustrated in FIGS. 1 to 3, the end-hose adapter 100 includes a control unit 114.

The control unit 114 can be provided in the secondary housing 114. As it will be further detailed, the control unit is operatively connected to the pressure sensor 112, the light system 118 and the power supply 120.

The control unit 114 is configured for operating various components provided with the end-hose adapter 100. Multiple and various optional connection setups can be implemented. For example, a first battery 152a can be connected for powering only the light system 118, without connection to the control unit 114, and a second battery 152b can be connected to other components for supplying power thereto. In other words, not all electrical connections have to go through a single control unit.

The control unit 114 can include electronics, mechanical, electromechanical or optical components and/or devices required for operating other components of the end-hose adapter 100. Such components and/or devices can include, for example and without being limitative, electrical circuits, batteries, resistors, inductors, capacitors, switches, current and/or voltage sources, resistances, inductances, capacitances, connectors, optical fibers, lenses, mirrors, filters, gratings, prisms, windows, combinations thereof, or any other components that can be useful for monitoring the pressure in the end-hose adapter 100.

In some embodiments, the control unit 114 is a logic circuit 122, i.e. an electrical circuit, such as a logic gate. Generally speaking, this type of circuit can implement or represent a Boolean function, and can be configured for performing logical operation. The logic gate can take one or more inputs and produces a corresponding output. Logic gate can be embodied by a combination of diodes, transistors, switches, optics and/or mechanical elements.

In some embodiments, at least one of the first control signal 116 and the second control signal 117 is an electrical signal. For example, both the first control signal 116 and the second control signal 117 can be electrical signals.

The control unit 114 is configured to receive pressure information from the pressure sensor 112 and send a signal to the light system 118. As such, the control unit 114 can have the pressure sensor 112 as an input and the light system 118 as an output. More particularly, the control unit is configured to send at least one of the first and second signals 116,117 (which can be electric signals) toward the light system 118.

In some embodiments, for example when the secondary housing 144 is configured to be removably attached to the primary housing 140, the instrumentation, such as the control unit 114 can also be removable. Such a feature can be useful in the context of a defective part, in order to replace the defective part from the secondary housing 144.

In some embodiments, the end-hose adapter 100 further includes a control unit. The control unit is operatively connected to the pressure sensor to receive the brake air pressure signal, the control unit being configured to generate control signals including a first control signal 116 when the brake air pressure signal indicates a brake air pressure above a pre-determined pressure threshold, and a second control signal 117 when the brake air pressure signal indicates a brake air pressure below the pre-determined pressure threshold. The control unit is operatively connected to the light system to provide the control signals 116, 117 thereto to display the first or second color.

In one embodiment, multiple (e.g., four) pressure sensors 112 are provided to measure the train line pressure with a first set (e.g., two of the pressure sensors) being activated at a low pressure and supplying, for example, a red signal through lights provided with the light system 118, indicating that the system works and a second set (e.g. the other two pressure sensors) will be activated emitting a green color when the pressure is at or higher than the minimum train line pressure. In this embodiment, the control unit 114 can be configured to activate different lights at different conditions, and different sets of lights can be provided to emit different colors, intensities and/or patterns in response to a signal from the control unit 114.

Light System

As it has been previously mentioned, the light system 118 includes lights 124. The lights 124 can have a binary on/off configuration and are operatively connected to the control unit 114 via the light system 118. This binary configuration can be associated with a corresponding visual indicator (e.g., a color for each state).

The control unit 114 receives the pressure measured as an input and is configured to send a signal (i.e., one of the first and/or second control signal(s) 116, 117) to turn the lights 124 on when there is excess air flow and off when air flow is within pre-determined limits.

In alternate embodiments, the lights 124 could be configured to have multiple different colors, intensities and/or flashing patterns. In such configuration, the light 124 have more than two binary on/off configuration. For example, the state of the lights 124 can be continuous or can include a plurality of discrete steps. The control unit 114 is configured accordingly and can be configured to cause the lights 124 to turn a specific color, intensity and/or pattern in response to certain pressure readings or predetermined sequence initiated by the control unit 114.

In some embodiments, the light system 118 is provided to display a third visual indication, such as a third color, when the brake air pressure in the brake pipe is below a low-end value. The third color or no light when the brake air pressure in the brake pipe is detected below the low-end value. For example, the low-end value can be 20 psi. It will be readily understood that the low-end value could vary depending on the train brake line, and could range from 0 psi to 100 psi. in some implementation, the low-end value could be 25 psi, 30 psi or 35 psi.

As illustrated in FIG. 1, in some embodiments, the light system 118 comprises a plurality of lights 124 mounted to the exterior surface 108 of the housing 102.

The lights 124 can be mounted in spaced-apart relation with respect to each other, and so can be aligned in rows along the longitudinal axis of the end-hose adapter 100. In such embodiments, the lights 124 are mounted along a longitudinal section 128 of the housing.

Alternatively, the lights 124 can be disposed in an array defining a matrix, and can be selectively activated to form a predetermined pattern associated to a respective pressure threshold.

Figure 5:
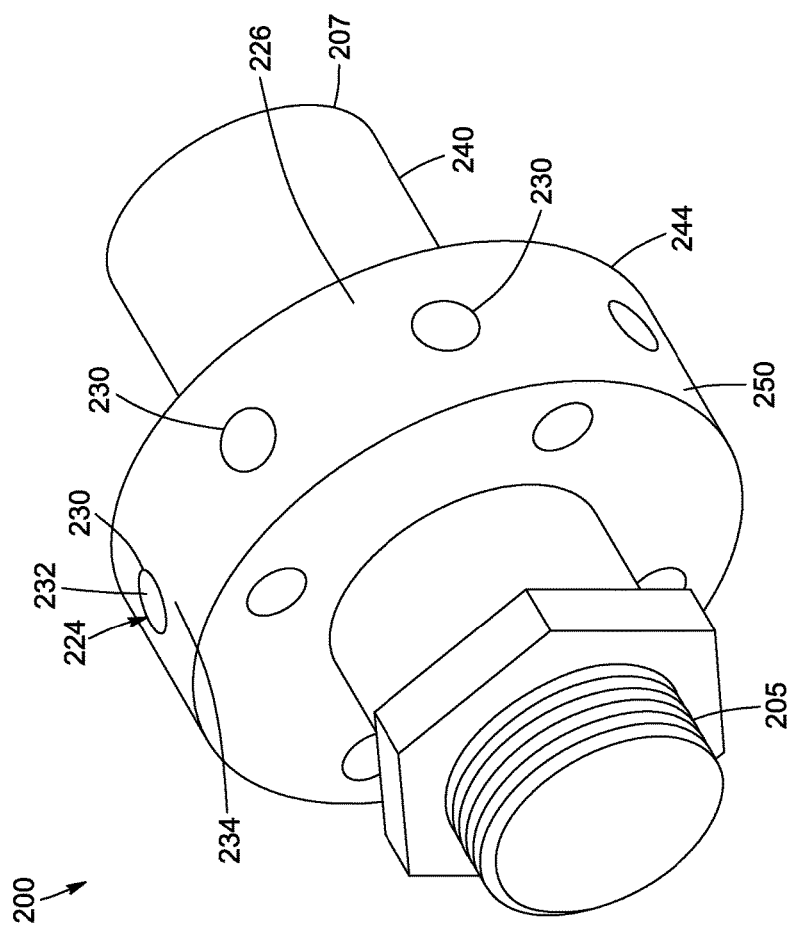
FIG. 5 shows an end-hose adapter for indicating brake air pressure status in brake pipes of multiple interconnected train cars, in accordance with another embodiment.
Figure 6:
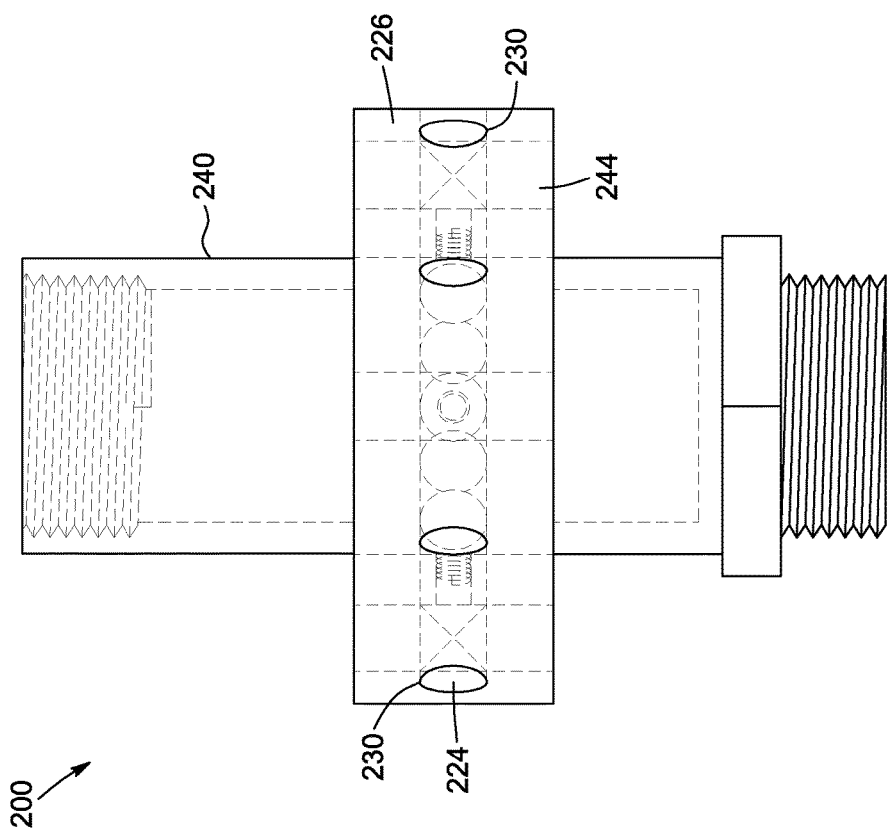
FIG. 6 shows another view of the end-hose adapter illustrated in the embodiment of FIG. 5.
Figure 7:
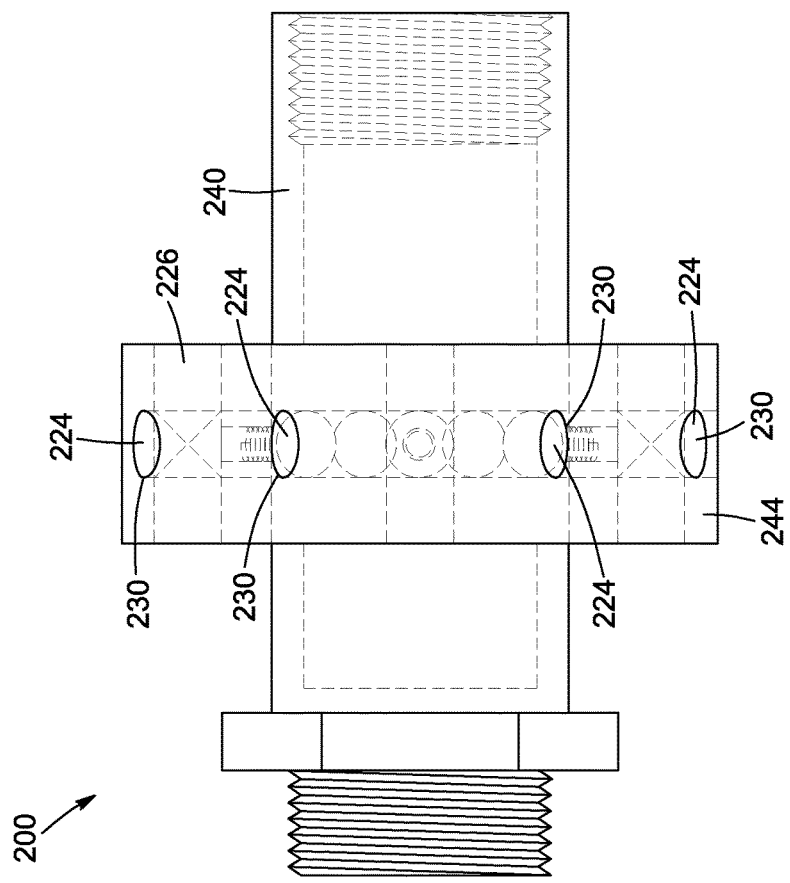
FIG. 7 is a representation of the end-hose adapter illustrated in the embodiment of FIGS. 5 and 6.
Figure 8B:
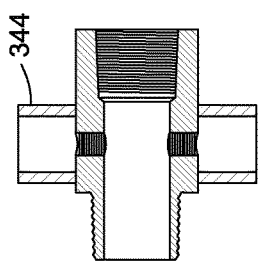
FIGS. 8A-8D are different views of an end-hose adapter for indicating brake air pressure status in brake pipes of multiple interconnected train cars, in accordance with another embodiment.
Figure 8D:
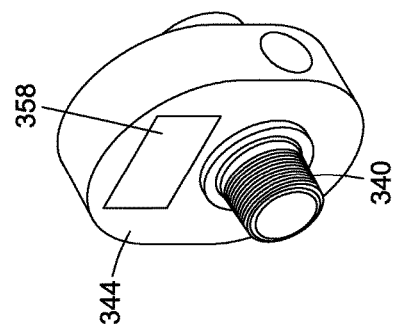
Figure 8A:
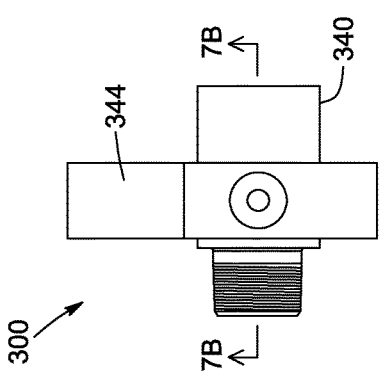
Figure 8C:
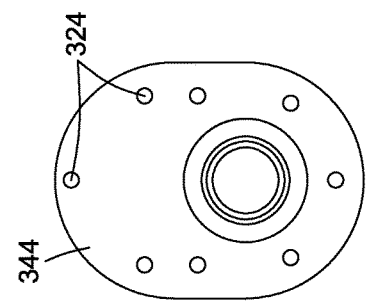

Now turning to FIGS. 5 to 7, an embodiment of an end-hose adapter 200 is shown, wherein the features are numbered with reference numerals in the 200 series respectively which correspond to the reference numerals of the previously described embodiments. In such an embodiment, the lights 224 are mounted around a radial periphery 226 of the housing, e.g., the secondary housing 244.

In some embodiments, better illustrated in FIGS. 5 to 9, but also apparent in FIGS. 1 and 3, the axial outer surface 150, 250 of the secondary housing 144, 244 includes a plurality of depressions 130, 230, and the lights 124, 224 are at least partially embedded within respective depressions 130, 230.

In some scenarios, the depressions 130, 230 and the lights 124, 224 are sized and configured such that outer surfaces 132, 232 of the lights 124, 224 are generally flush with adjacent regions 134, 234 of the axial outer surface 150, 250 of the secondary housing 144, 244. Alternatively, the depressions 130, 230 and the lights 124, 224 are sized and configured such that the lights 124, 224 partially protrude from the respective depressions 130, 230.

Depending on the configuration of the light system 118, the lights 124, 224 can be mounted to face radially or axially outward. Some of the possible orientations and configurations are illustrated in the different figures.

The plurality of lights 124, 224 can include light emitting diodes (LEDs).

In some embodiments, the lights 124, 224 are configured such that all of the lights simultaneously display either the first color, the second color or the third color. Alternatively, the lights 124, 224 can be configured to display at least one of the three colors before the two others, and vice-versa, according to a predetermined illumination frequency, associated, for example, to a particular pressure value. As such, the predetermined illumination frequency at which some of the colors appear can be representative of the pressure measured in the train brake line, and can indicate to an operator that a verification or maintenance has to be made on a specific freight car.

In some embodiments, the lights 124, 224 include first and second sets of the lights that are configured such that, when the brake air pressure in the brake pipe is above the pre-determined pressure threshold, the first set of the lights displays the first color and the second set of the lights turns off, and when the brake air pressure in the brake pipe is below the pre-determined pressure threshold, the second set of the lights displays the second color and a first set of the lights turns off. For example, the light system is configured such that the first color is red and the second color is green.

Power Source

As it has been implicitly mentioned, each of the components of the end-hose adapter 100 has to be powered. For example, the pressure sensor 112, the control unit 114 and the light system 118 need to be powered to operate. In this regard, the end-hose adapter 100 further includes a power source 120.

The power source 120 is operatively connected to at least one of the control unit 114, the pressure sensor 112 and the light system 118 to provide power thereto. Alternatively, the power source 120 could be operatively connected to only one of the pressure sensor 112, the control unit 114 and the light system 118, and relays and distribute the remaining power to the other two of the aforementioned components.

In some embodiments, the power source 120 comprises a battery 152 mounted within the housing 102. As illustrated in the embodiments illustrated in FIGS. 1A-G, the power source 120 comprises two batteries 152a,b mounted in respective gaps 158a,b. The respective gaps 158a,b are provided within the housing 102 of the end-hose adapter 100. As illustrated, the gaps 158a,b are provided in the secondary housing 144. Of course, the gaps 158a,b could be provided elsewhere in the housing 102, such as in the primary housing 144.

Figure 11:
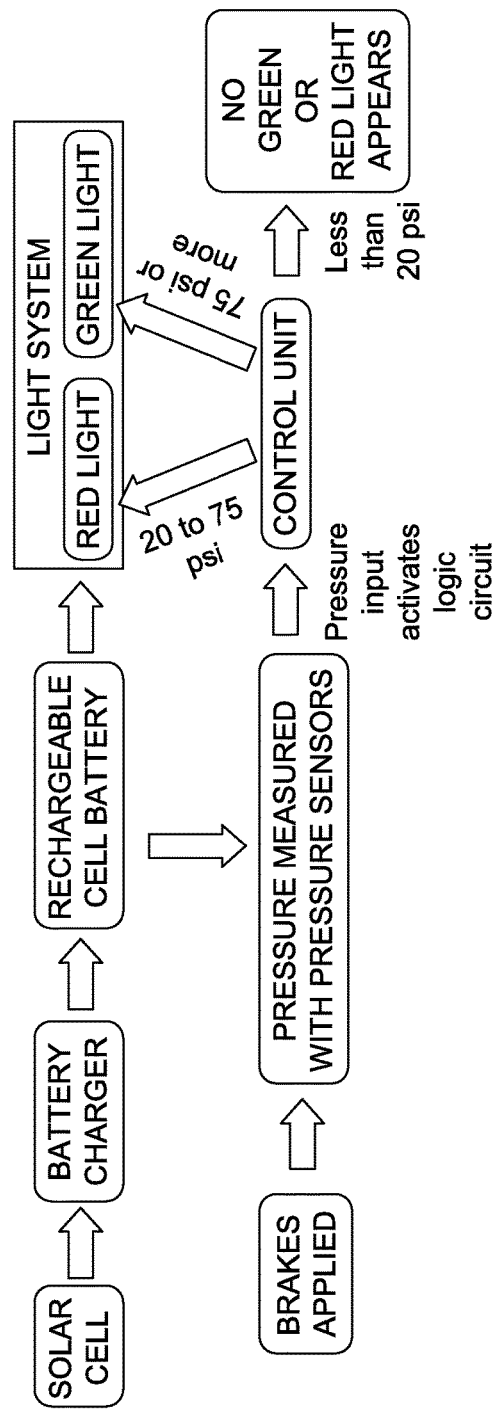
FIG. 11 is a schematic representation of various components and their operational cooperation, in accordance with an embodiment.
Figure 19:
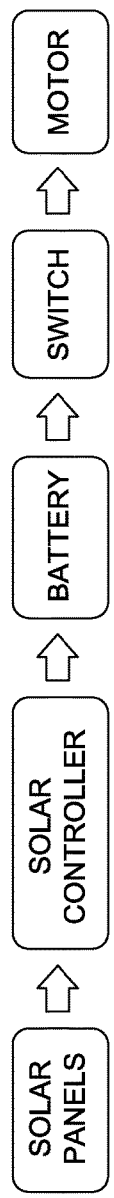
FIG. 19 is a block of different components in a motorized drive shaft system with solar power for hopper cars.
Figure 20:
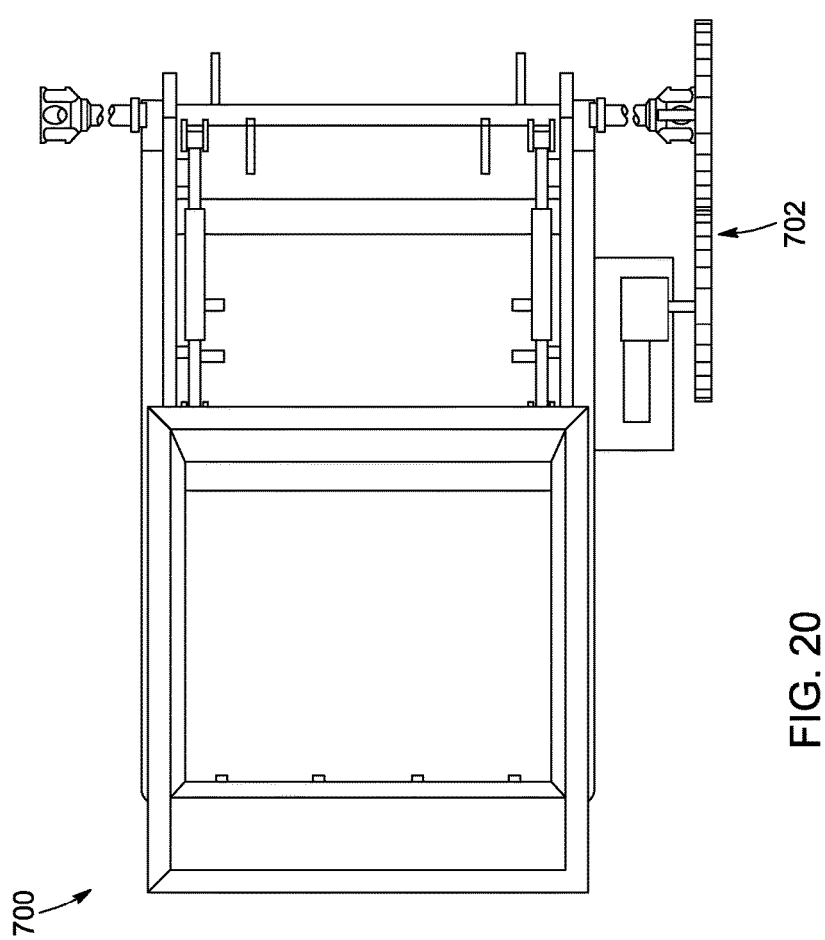
FIG. 20 is a top plan view of a gravity discharge gate with a motorized drive shaft system.
Figure 21:
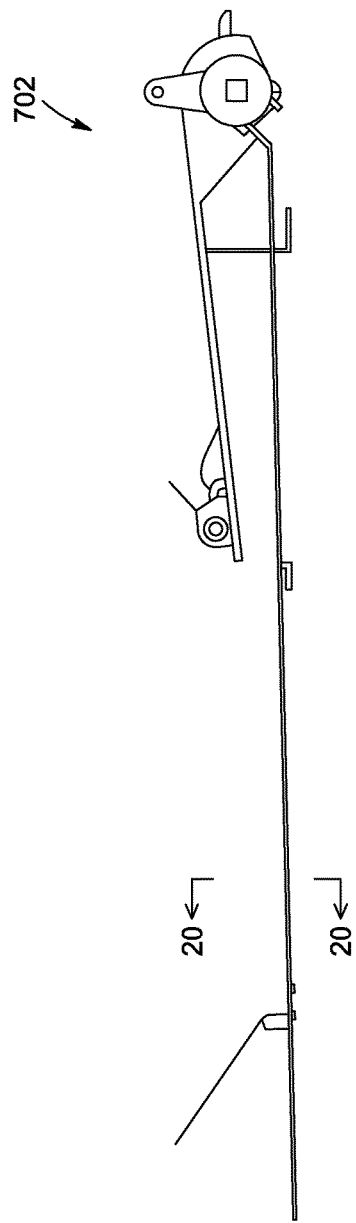
FIG. 21 is a side plan view of a gravity discharge gate with a motorized drive shaft system.
Figure 22:
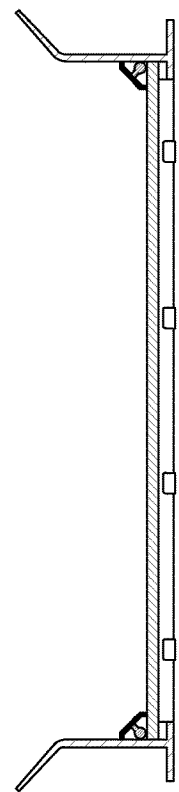
FIG. 22 is a plan view along A-A of FIG. 20.
Figure 23:
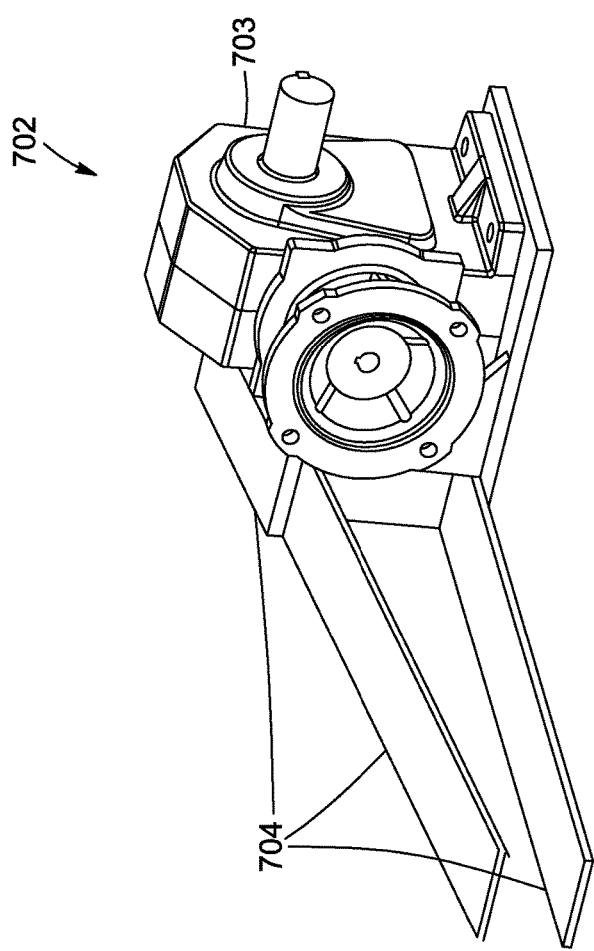
FIG. 23 is a perspective view of a motorized drive shaft system.
Figure 24:
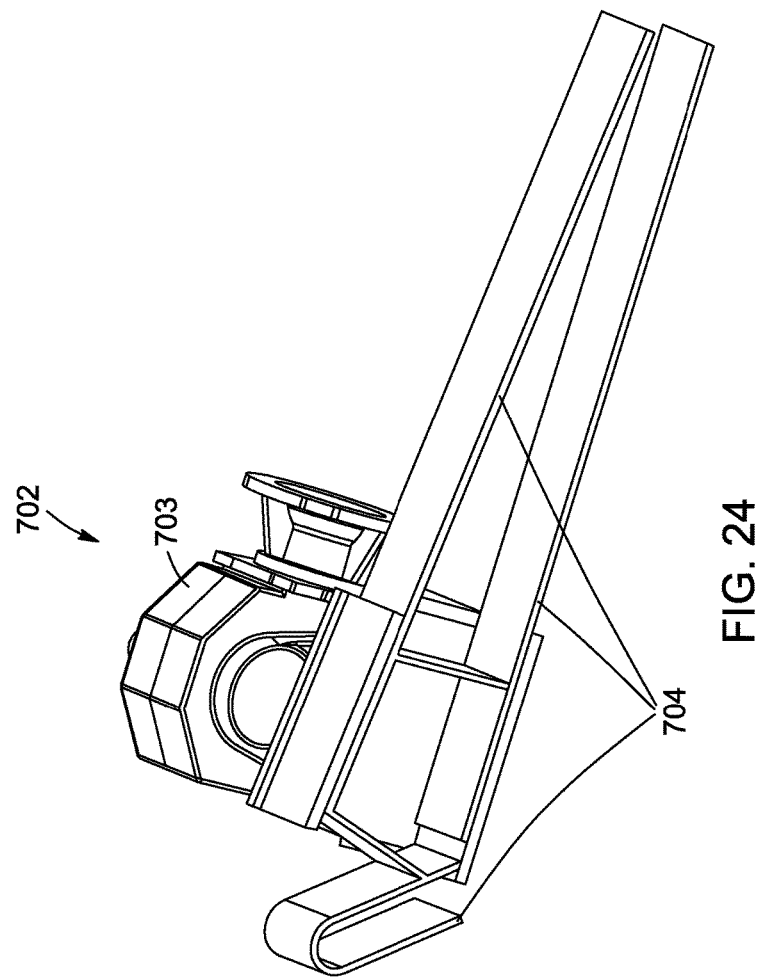
FIG. 24 is a perspective view of a motorized drive shaft system.
Figure 25:
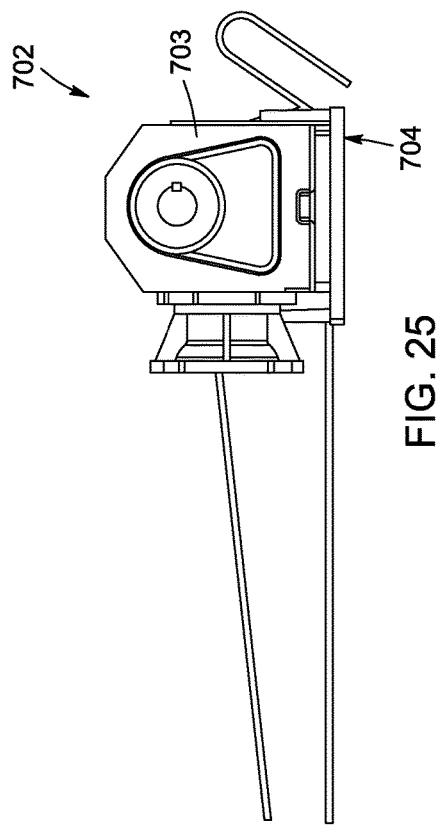
FIG. 25 is a front view of a motorized drive shaft system.
Figure 26:
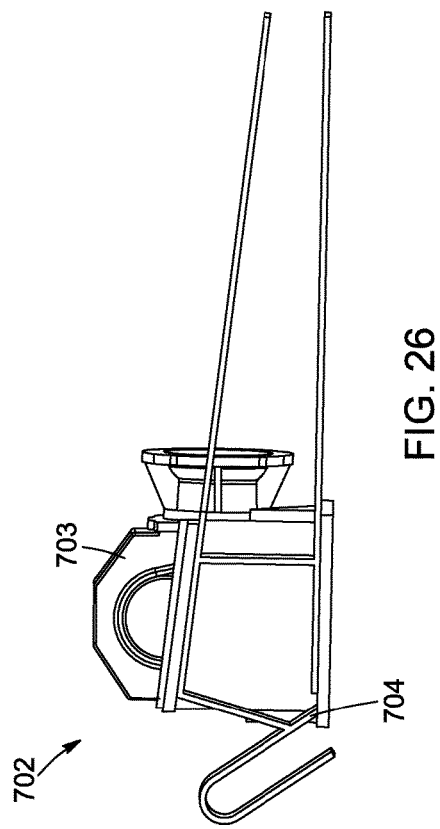
FIG. 26 is a back view of a motorized drive shaft system.

As illustrated in FIG. 11, but also in FIG. 19, in some embodiments, the power source 120 further includes a solar panel 154 operatively connected to the battery 152. The solar panel 154 can mounted to part of the axial outer surface 150 of the secondary housing 144. The solar panel 154 is coupled to the battery 152 for providing power thereto.

In some embodiments, the power source 120, part of the light system 118, and the control unit 114 are embedded within the secondary housing 144 that comprises a molded body (i.e. in the epoxy material provided in the inside portion of the secondary housing 144).

In other embodiments, the lights 124, the power source 120 and the control unit 114 are positioned against the exterior surface 108 of the primary housing 140.

It should also be noted that the power source 120 (e.g., batteries 152) can be configured to be rechargeable in a recharge unit that is powered by solar energy. The recharge unit can be integrated onto the end-hose adapter 100 or integrated onto other components of the freight car or train system. The end-hose adapter 100 can also be integrated with other enhanced equipment features.

In some embodiments, the end-hose adapter 100 further includes a wireless signal generator 160 connected to the housing 102 (see, for example, FIG. 3). The wireless signal generator 160 is configured to send wireless signals based on the brake air pressure signal to a wayside receiver, as so can transfer data at an operation center, which can, but is not necessary mounted on the train. For example, the operation center could be located along the railways or at train stations.

Examples of End-Hose Implementations

Now that the general structure and some embodiments of the end-hose adapter 100 have been described in detail, different examples of implementation will be presented.

As illustrated in FIGS. 1 to 10, the end-hose adapter generally has a compact design and is easily attachable to the threaded end of the car end hose.

Referring to FIGS. 8A to 8D, another implementation of the end-hose adapter 300 is illustrated, wherein the features are numbered with reference numerals in the 300 series respectively which correspond to the reference numerals of the previously described embodiments. As most of the illustrated components are similar to the corresponding components of the embodiments which have been previously described, not all the components will be numbered and described. The secondary housing 344 includes a gap 358 (shown as rectangular section in FIG. 8D) for battery insertion (not illustrated in FIGS. 8A-D. This configuration can facilitate battery insertion and replacement. In this implementation, two instead of four pressure sensors (not shown) are used. The secondary housing 344 is also offset with respect to the primary housing 340, and has a general stadium-like shape (best seen in FIGS. 8C and 8D) with the gap 358 (shown in FIG. 8D) being provided on one end wall and the lights 324 being provided on the opposed end wall.

Now turning to FIGS. 9A to 9C, another implementation of the end-hose adapter 400 is illustrated, wherein the features are numbered with reference numerals in the 400 series respectively which correspond to the reference numerals of the previously described embodiments. As most of the illustrated components are similar to the corresponding components of the embodiments which have been previously described, not all the components will be numbered and described. In this implementation, the gap 458 for the battery (not illustrated) is provided on the side wall of the secondary housing 444. The secondary housing 444 can include a first disk-shaped portion 445 and a second box-like portion 447, which extends outward from the disk-shaped portion 445 and includes the gap 458 for the battery. The box-like portion 447 can house the battery while the disk-shaped portion 445 can house the other components (the pressure sensors, the lights, the control unit, the power source, and the like.).

Figure 10C:
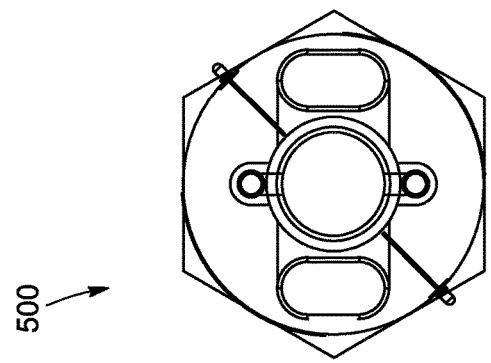
FIGS. 10A-10C illustrate an end-hose adapter for indicating brake air pressure status in brake pipes of multiple interconnected train cars, in accordance with another embodiment.
Figure 10B:
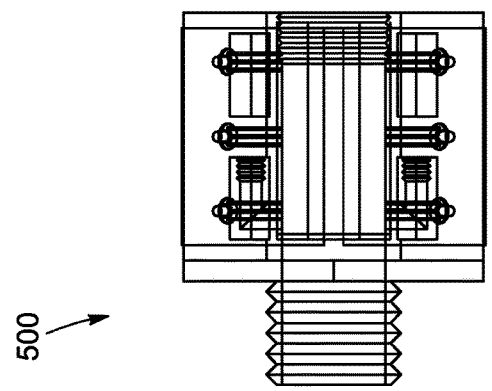
Figure 10A:
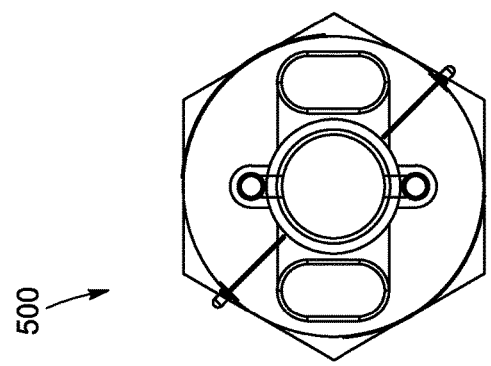

Now referring to FIG. 10A to 10C, a variant the end-hose adapter 500 is illustrated. This variant is generally similar to that of FIGS. 1A-G, but has some differences, such as the size and shape of certain components.

Operation of the End-Hose Adapter

Now that different implementations of the end-hose adapter have been introduced, operation of the end-hose adapter will briefly be described.

FIG. 11 illustrates one possible operation of the system including the end-hose adapter. As depicted by the workflow chart, when the brakes are applied, the pressure is measured by the pressure sensors, which send a signal to the control unit regarding the measured pressure. In this example, if the pressure is below 20 psi, no lights turn on; if the pressure is at or above 20 psi, red lights turn on but if the pressure is below 75 psi then the green lights do not turn on; and if the pressure is at or above 75 psi, the green lights turn on. Other configurations, and other pressure settings and logic systems, are possible.

A complete train equipped with end-hose adapters will enable car inspectors to walk the train after the brake system is fully charged and identify any car with brake pipe pressure less than the minimum required indicating excessive air leak in the segment of the train inspected. In the example of FIG. 11, if at the entry of a car the green light appears and at the exit of the same car a red light appears that indicates air leakage that needs investigation. When at an exit of a car the green light appears and at the entry of the next car a red light appears that indicates leakage at the glad hand connection. If no light appears on a given adapter, it may indicate that the adapter power supply requires replacement or that there is an excessive air leak (e.g., pressure below 20 psi). If the brakes are fully charged and the end-hose adapters are showing either green colour LEDs or red colour LEDs and a couple with no lights then the no-lights in this case means the power supply needs replacing or the complete adapter needs to be replaced.

Examples were given as to how to differentiate between detecting leakage in car brake system/piping versus leakage at the glad hand connection, when the first red light is detected, when walking the train. For example, the first red light detected, when walking the train, will indicate that the train line pressure has gone below 75 psi, which indicates a leakage problem. However, the first red light detected will not necessarily identify the cars experiencing air leaks, ahead or prior to that point. The system can require the installation of pressure transducers to measure the pressure accurately at the beginning and at the end of each car as in the SMART adapter set up. In such implementations, a feedback loop can be provided. The feedback loop could measure, for example, the pressure difference between two consecutive transducers, and feeds this information wirelessly back to the train inspector or locomotive engineer, if the locomotive is equipped with a display unit.

As it has been previously introduced, in some implementations, the end-hose adapter can be configured and connected to a detector system to facilitate automated detection. Such a configuration is compatible with the operation as presented in the current description. For example, the adapters can be provided with communication capabilities to communicate with a way-side detector system (e.g., set up by North American Railroads). The adapters can be equipped with wireless signal generators to send wireless signals of various types to the way side receivers. The way side system can also be configured to not only receive such signals but also to generate signals in response in order to communication with other systems, as needed. An example of wireless signal generators is based on other wireless communication platform, such as Bluetooth technology.

It is to be noted that the end-hose adapter 100 is not limited to air brake systems. Indeed, in advanced brake performance monitoring system, it is feasible to communicate (i.e., exchange) information from the end-hose adapter 100 to instrumented hand brakes by using devices compatible with a wireless communication platform (e.g., the Bluetooth technology), which can be in turn used to instruct cars or cars driver and/or operator to apply or release the hand brakes, depending on whether the train is stopped for a long period with only the air brakes applied or is made up and ready to go into service in which case all hand brakes need to be released first.

Embodiments of the end-hose adapter and its operation can facilitate various functionalities and advantages, such as facilitating detection of excessive air leaks on either end of freight cars by measuring the air pressure at both ends of a freight car; facilitating detection of excessive air leaks at the glad hands of two cars coupled together by measuring the air pressure at both ends of cars coupled together; providing a light emitting system capable of identifying car ends with low pressure indicating excessive air leaking on that particular car; providing a built-in power supply to provide sufficient voltage and current to the pressure sensors and the light emitting components; providing a power supply to be of the rechargeable type; providing a construction that enables encasing the pressure taps, the light emitting diodes, the power supply and the circuit board attachable to the threaded end of the car end hose; enabling the signal emitting portion (e.g., light emitting units in some embodiments) to communicate with the way-side system detectors of North America Railroads.

Kit for Indicating Brake Air Pressure Status in Brake Pipes of Multiple Interconnected Train Cars The end-hose adapter described so far can be provided as being part of a kit for indicating brake air pressure status in brake pipes of multiple interconnected train cars. The kit includes at least one end-hose adapter. The end-hose adapter has a broad variety of characteristics, components and features, such as the ones which have been presented in the current description, namely, each one of the end-hose adapter includes a housing, a pressure sensor, and a light system.

The kit can further include a control unit and a power source, both being similar to the ones which have been previously described.

The different components of the kit can be assembled on-site or can be partially pre-assembled prior to incorporating the end-hose adapters into the train cars. Each end-hose adapter kit can also include, in some cases, connection adapters for connecting either end to the different parts of the train car system.

Figure 12:
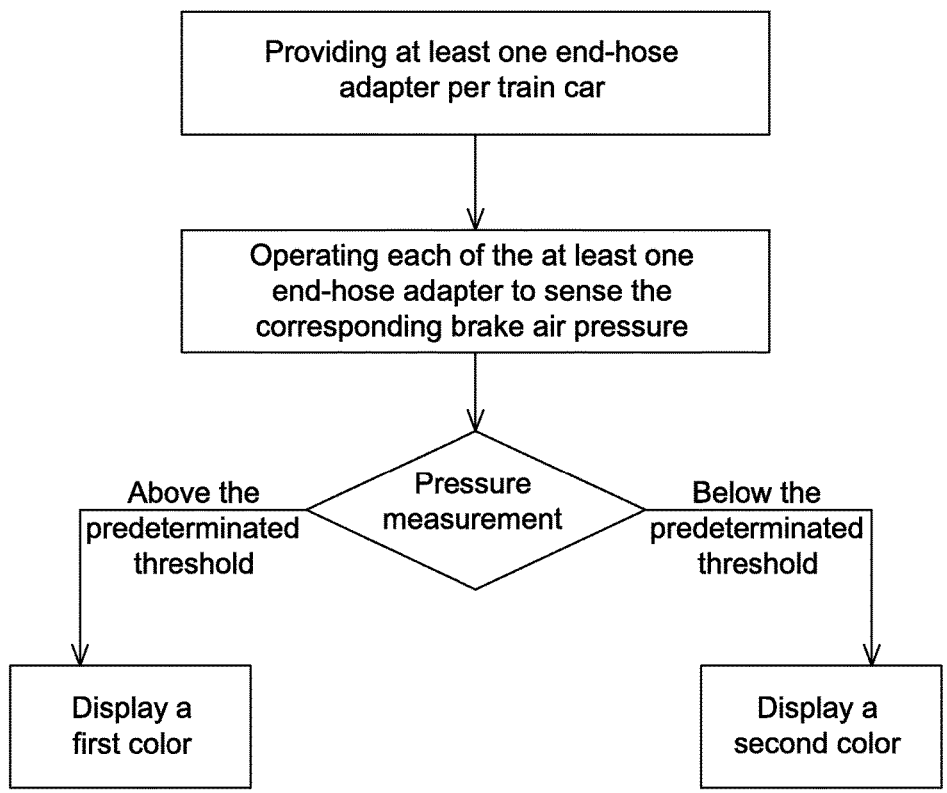
FIG. 12 is a workflow chart illustrating a method for indicating brake air pressure status in brake pipes of multiple interconnected train cars, in accordance with an embodiment.

Method for Indicating Brake Air Pressure Status in Brake Pipes of Multiple Interconnected Train Cars Turning to FIG. 12, a method for indicating brake air pressure status in brake pipes of multiple interconnected train cars is provided. Embodiments and implementations of this general method rely on the end-hose adapters and kit which have been described in the previous sections. The method includes a step of operating at least one end-hose adapter per train car, each end-hose adapter being mounted between a train car end hose and a brake pipe to be in fluid communication therewith. The end-hose adapter(s) is configured in a similar manner to what has been already introduced, and are used to sense the brake air pressure in the brake pipe and provide first visual indication when the brake air pressure is within an operable range and a second visual indication when the brake air pressure is below an operable value and is experiencing leakage.

Figure 13:
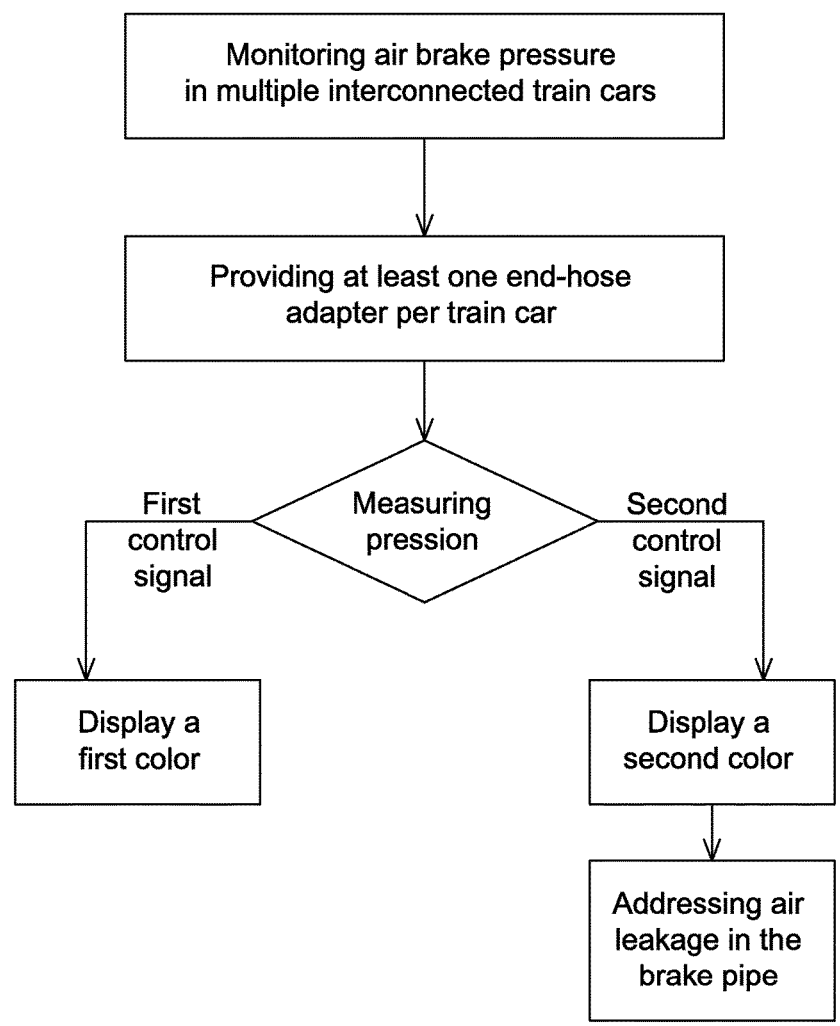
FIG. 13 is a workflow chart illustrating a method for indicating brake air pressure status in brake pipes of multiple interconnected train cars, in accordance with another embodiment.

Now turning to FIG. 13, there is provided another method for indicating brake air pressure status in brake pipes of multiple interconnected train cars. This method for indicating brake air pressure status in brake pipes of multiple interconnected train cars is similar to the previous one, as it relies on the operation of the end-hose adapter.

This method includes a step of providing at least one end-hose adapter per train car. As it has been previously described in greater detail, each end-hose adapter includes a housing, a pressure sensor, a control unit, a light system and a power source. The housing includes opposed ports connectable with a train car end hose and a brake pipe respectively, an exterior surface, and a channel extending between the opposed ports and being in fluid communication with brake air within the brake pipe. The pressure sensor is mounted to the housing and extends within the channel. The pressure sensor is configured to sense brake air pressure within the brake pipe and generate a brake air pressure signal. The control unit is operatively connected to the pressure sensor to receive the brake air pressure signal, and configured to generate control signals. The control signals include a first control signal and a second control signal: the first control signal when the brake air pressure signal indicates a brake air pressure above a pre-determined pressure threshold, and the second control signal when the brake air pressure signal indicates a brake air pressure below the pre-determined pressure threshold. The light system is mounted with respect to the exterior surface of the housing and configured to receive the control signals from the control unit and to display different colors in response to different control signals. The power source is connected to the pressure sensor, the control unit, and the light system to provide power thereto.

The method illustrated in FIG. 13 also includes a step of operating each of the end-hose adapters to sense the corresponding brake air pressure within the corresponding brake pipe to which the end-hose adaptor is mounted such that when the brake air pressure in the brake pipe is above the pre-determined pressure threshold, the light system of the end-hose adapter is operated to display a first colour, when the brake air pressure in the brake pipe is below the pre-determined pressure threshold, the light system of the end-hose adapter is operated to display a second colour indicating air leakage in that brake pipe.

Methods for Manufacturing End-Hose Adapters

Figure 14:
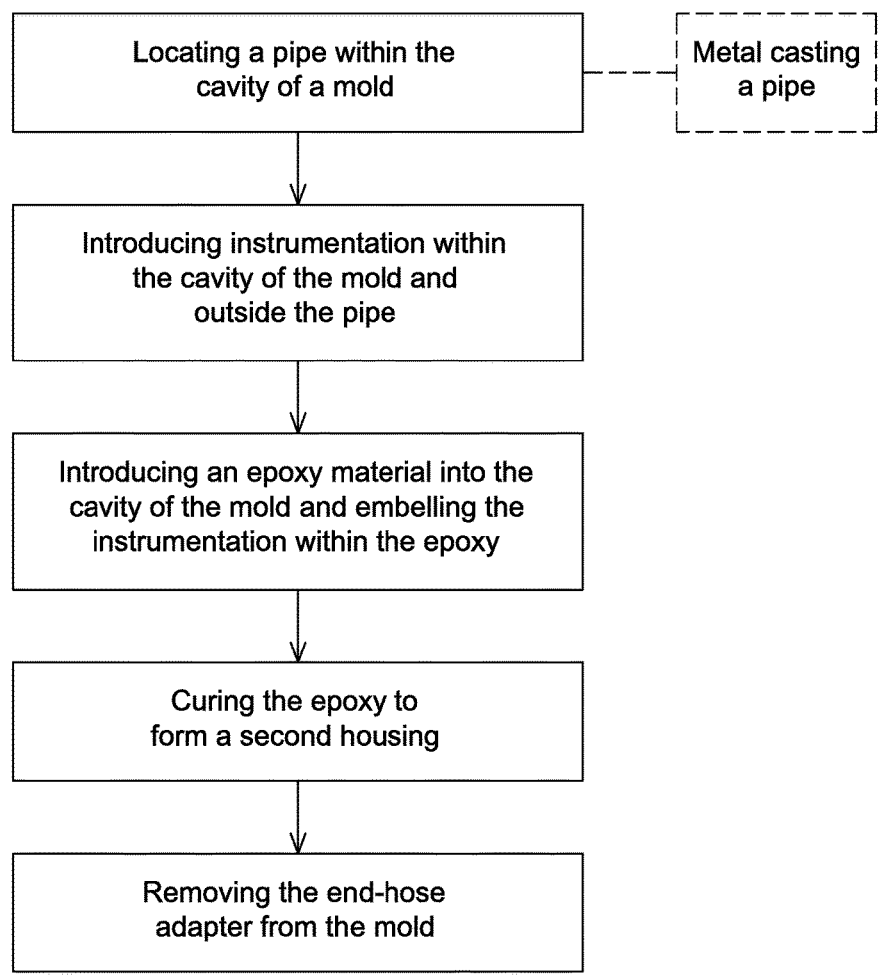
FIG. 14 is a workflow chart illustrating a method for manufacturing end-hose adapters, in accordance with an embodiment.

Now turning to FIG. 14, a method for manufacturing end-hose adapters is illustrated. The method includes a step of locating a pipe within a cavity of a mold. The pipe is a primary housing and includes opposed ends adapted for connection to an end hose and a brake pipe of a train car, an internal channel defined by pipe walls, and an opening through the pipe wall thereof.

The method also includes a step of introducing instrumentation within the cavity of the mold and outside of the pipe, the instrumentation including a pressure sensor introduced through the opening of the pipe so that a pressure sensing tip is located within the internal channel, a light system, a control unit, a power source, wire connections for inter-connecting the pressure sensor, the control unit, the power source, and the light system, to enable signal communication from the pressure sensor to the light system such that the light system can display visual indications in response to brake air pressure detected in the brake pipe by the pressure sensor.

The method also includes steps of introducing an epoxy material into the cavity of the mold, thereby embedding the instrumentation within the epoxy, curing the epoxy to form a secondary housing coupled to the primary housing which together form the end-hose adapter, and removing the end-hose adapter from the mold.

In some embodiments, the method includes a step of molding resin to for the secondary housing.

In some embodiments, the method includes a step of metal casting the pipe forming the primary housing.

As a result of this manufacturing method, the end-hose adapter can have different features and characteristics. For example, the secondary housing can be a mold if it is made of epoxy or a casting if it is made of metal. The design is similar for either method of manufacturing. In both cases, the end-hose adapter has compartments (e.g., gaps or the like) for the various components of the system (see for example FIGS. 1 to 3). Batteries, Logic Circuits, LED lights, and the like are positioned in their respective cavity areas (or gaps), which are created by the resin mold or the casting, depending on the manufacturing method. The epoxy material is then introduced into the cavity of the mold or the casting, thereby embedding the system components within the epoxy, and maintaining the system components in place.

There are other potential methods of manufacturing the end-hose adapter. For example, the secondary housing can include an outer shell composed of a metallic material (e.g., steel) and having an internal cavity. The shell can be coupled to the primary housing with the instrumentation being located within the cavity, and then a resin can be fed into the cavity to secure the components together. In this case, the shell is the mold for the resin but remains part of the end-hose adapter rather than being removed after curing of the resin.

In other examples, the secondary housing could be constructed to include an outer shell with an internal cavity, and the instrumentation is mounted within the cavity without resin. For instance, the instrumentation can be attached in various ways and using various securing methods to the primary housing or within the cavity of the secondary housing, and the secondary housing can be attached to the primary housing using various methods including mechanical (e.g., screws, bolts, etc.) and/or chemical (e.g., adhesives) methods.

Gravity Discharge Gate

Figure 15:
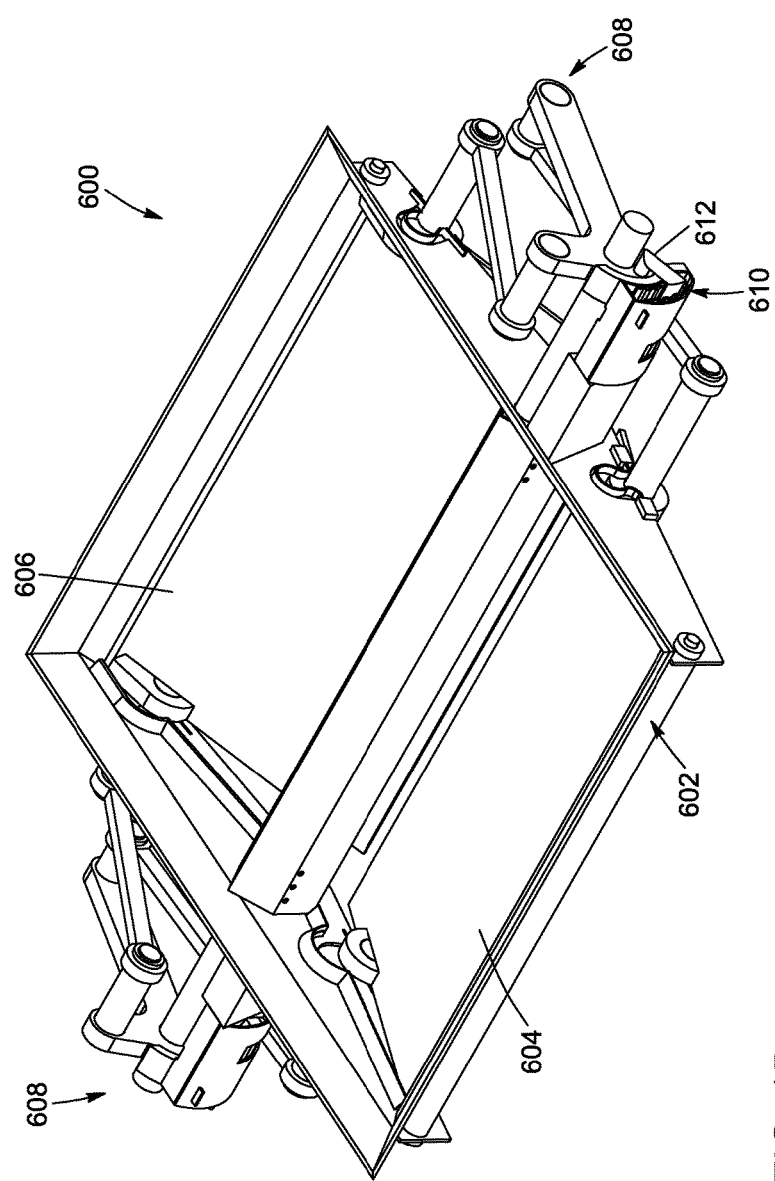
FIG. 15 is a perspective view of a gravity discharge gate having a bubble lock for use with a freight car.

Referring to FIG. 15, a gravity discharge gate 600 for use in a covered hopper car is illustrated. Gravity discharge gates are widely used in covered hopper cars in Canada to transport grain and potash, for example. There are mainly two types of sliding plate operating mechanisms on gravity discharge gates. One operating mechanism is called the rack-and-pinion and the other is called the Toggle-Lock®. Conventionally, both mechanisms have a one-piece horizontal sliding gate plate. Both types present various issues that can lead to challenges in opening and closing the gate. Due to the sliding feature of the horizontal gate plate and the many drive shaft rotations that it takes to open and close the gate it can become harder and harder to operate hopper gates. When this happens, impact gate openers are used which can, in turn, exacerbate the problem of jamming and wear as they impart a jerk-like torque.

A bubble-lock gate 602, such as the embodiment illustrated in FIG. 15, presents advantages over the conventional techniques as will be described in further detail below.

The bubble-lock gate 602 includes two rotating plates 604, 606 instead of sliding plates, thus substantially reducing or eliminating transverse motion of the gate plate. At the same time, the discharge time is reduced leading to faster discharge rates of the commodity. The bubble-lock gate 602 also does not require the use of impact gate openers. The concept is illustrated in FIGS. 15 to 18, where two locking mechanisms are provided.

Referring to FIGS. 15 to 17, the primary locking mechanism 608 has a spring steel lock profile having a bubbled shape (also referred to as the "bubble lock 610"). Referring to FIG. 15, the spring steel lock profile secures the rotating plate(s) 604, 606 in locked position. Extension rods 612 on the rotating plates 604, 606 pass through multiple necks of the bubble lock 610, which act as intermediate stages of gate door securement, until the gate 602 is fully open or closed.

At the top of the bubble lock 610 there may be an extension that may take the form of opposed flanges 614 that project in opposed directions from the opposed sides of the spring steel lock structure, and the flanges 614 can be securely inserted into part of the gravity discharge gate 600 for securing thereto. This can prevent the bubble lock 610 from being shifted out of position. The flanges 614 can be plate shaped and may be square or rectangular. At the base of the bubble lock 610 there may be another structure for securely fitting the bubble lock. The base structure can be generally tubular and can have a quarter stadium cross-sectional shape or another shape for fitting into a corresponding recessed part of the gravity discharge gate.

Figure 16B:
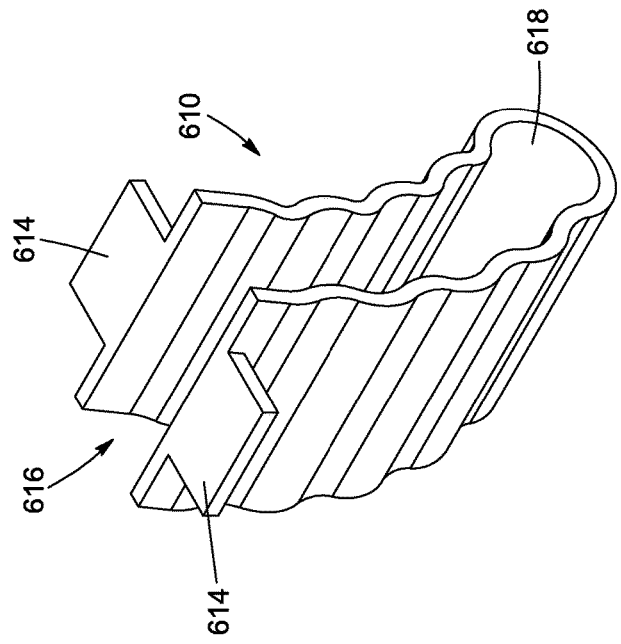
FIGS. 16A-16B are a plan view of part of a bubble lock mechanism (primary locking mechanism) and a perspective view of part of a bubble lock mechanism (primary locking mechanism), respectively.
Figure 16A:
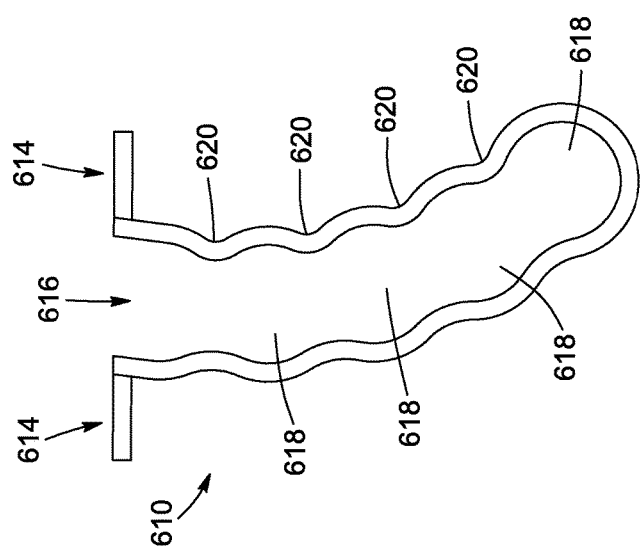

FIGS. 16A-B show a bubble plate structure 616 having four successive bubble portions 618, each adjacent pair of bubble portions 618 being connected via a neck portion 620. The bubble plate structure 616 can be configured so that the bubble portions 618 have substantially similar dimensions, and the neck portions 620 also have substantially similar dimensions. The bubble plate structure 616 can define two opposed generally smooth curvilinear surfaces.

In some implementations, the bubble portions 618 can be defined by inner concave surfaces that have a radius of curvature between about $13/32$ inch and about $7/16$ inch. The inner concave surfaces of the bubble portions 618 can also have a curvature that generally corresponds to that of the external curved surface of the extension rods that pass through the bubble lock 610. The neck portions 620 can be defined by convex surfaces that have a radius of curvature between about $1/4$ inch and about $17/32$ inch. The bubble lock 610 can also be configured such that the largest spacing at each bubble portion 618 is between about $13/16$ inch and about $7/8$ inches, or from about 1 to about 1.1 times (e.g., 1.08 times) relative to the diameter of the extension rods 612 (which are typically $3/4$ inch in diameter) that pass through the bubble lock 610. The smallest spacing at each neck portion 618 can be between about $9/16$ inch and about $5/8$ inch, or about 0.8 to 0.9 times (e.g., 0.83 times) relative to the size of the extension rods 612 that pass through the bubble lock 610. The length of each bubble portion 618 can be about 0.535 inch maximum and the length of each neck portion 620 can be about 0.425 inch maximum, for example. There may be at least two, three, four or more bubble portions 618 in a row. The terminal bubble portion 618 can have a continuous curvature joining the two opposed bubble plates and can be shaped and sized to receive the extension rods 612. In addition, for the purposes of disclosure and not limiting the scope of the innovations described herein, it is noted that all the Figures cannot be considered as being to scale.

Figure 17B:
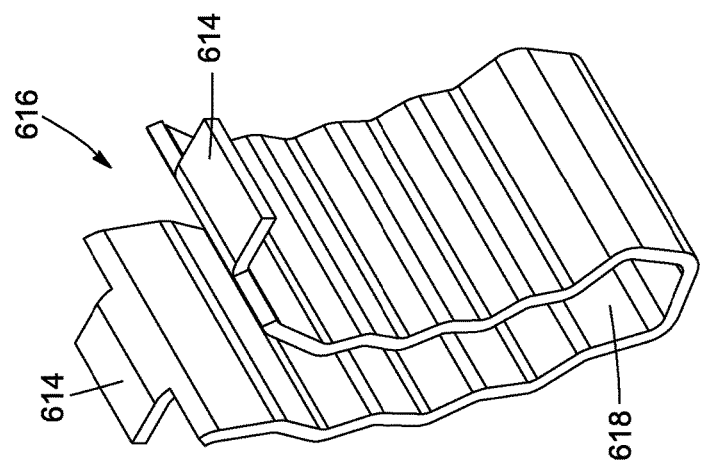
FIGS. 17A-17B are a plan view of part of a polygonal lock mechanism (primary locking mechanism) and a perspective view of part of a polygonal lock mechanism (primary locking mechanism), respectively.
Figure 17A:
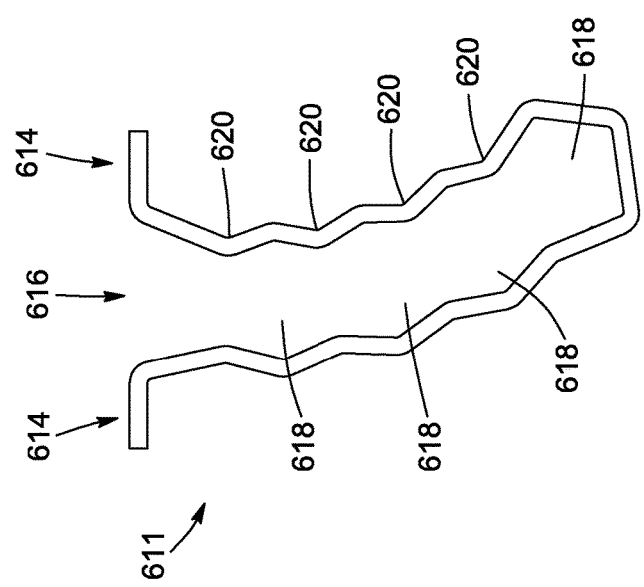

Now referring to FIGS. 17A-B, an embodiment of a polygonal lock 611 is shown. The polygonal lock is similar to the bubble lock 610. However, the polygonal lock 611 includes two opposed flexible housings that have a profile having a "polygonal" shape, forming polygonal portions 618 and necks 620. In some embodiments, the polygonal profile is embodied by triangular pointed portions and necks. Extension rods on the rotating plates pass through multiple necks of the "polygonal" lock, which the profile design acts as intermediate stages of gate door securement, until the gate is fully open or closed. It will be readily understood that that the term "bubble", used in the context of the present description is not necessary limited to a round shape, but could also encompass, in some variants, oval shape, pointed bubbles or any polygonal profile. The polygonal profile provides both flexibility and springing action to secure the doors locked.

Figure 18B:
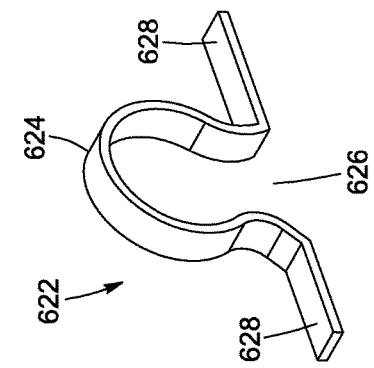
FIGS. 18A-18C are a plan view of part of a secondary locking mechanism, a perspective view of part of a secondary locking mechanism, and a perspective view of part of a secondary locking mechanism including a retainer, in accordance with an embodiment.
Figure 18A:
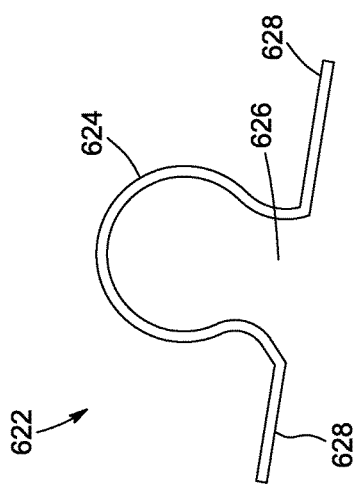
Figure 18C:
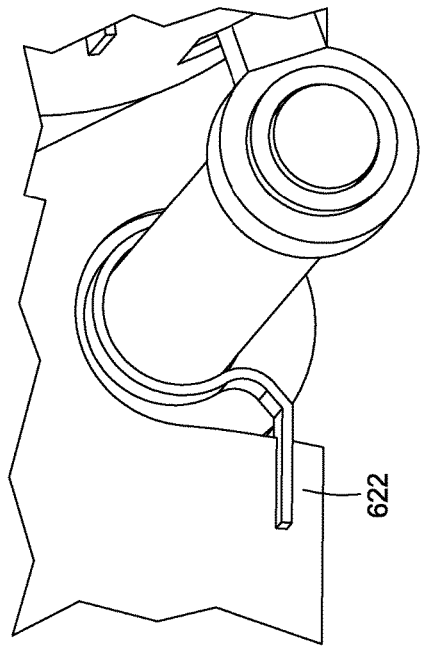

FIGS. 18 and 18A-C show a secondary locking mechanism 622 that is positioned on a different part of the gravity discharge gate 600. The secondary locking mechanism 622 can include collar members 624, which can be made of spring steel. The collar members 624 can include an open collar having a neck 626 defining an opening and a head defining inner receiving area. The collar member 624 can also include opposed projections 628 extending from respective extremities of the open collar. The collar member can be mounted to the side walls of the gravity discharge gate 600, which may involve inserting the projections into retainer elements provided on the side walls, as illustrated in FIG. 18C. The opening defined by the neck 626 is smaller than the diameter of the cylindrical handles so that when the cylindrical handles pass through the opening the neck part flexes outward and allows passage into the inner receiving area of the head. The cylindrical handles are thus nested within respective heads and the respective neck either return to their original position (non-flexed state) or clamp around the lower part of the cylindrical handles in a slightly flexed state, thereby enclosing the cylindrical handles and resisting removal.

Embodiments of the bubble-lock mechanisms 612, 622 can facilitate various functionalities and advantages, such as providing more efficient commodity discharge systems; providing a discharge system without a sliding plate thus mitigating against jamming of the gate plate that can occur with systems equipped with sliding gate plates; enabling a light weight gravity discharge system for hopper cars; reducing the discharge time for hopper cars carrying grain or potash; reducing the breakaway torque of the gravity discharge gate; and/or combining the bubble-lock mechanisms 612, 622 with a motorized drive shaft system to open and close the gates. Certain features of motorized drive shaft systems will be discussed in further detail below.

Motorized Draft Shaft

Referring to FIGS. 20 to 29, hopper car gravity discharge gates 700 can be equipped with to facilitate opening and closing the gates. In particular, a motorized drive shaft assembly 702, optionally powered by a solar energy capture-and-supply system, can ameliorate opening and closing gravity discharge gates 700.

Conventional gravity discharge gates, such as rack-and-pinion and Toggle-Lock® gates, have a sliding plate which opens and closes by means of a drive shaft. The rack-andpinion is composed of a gate frame, racks, pinions (gears), a drive shaft and a shaft bearing. The Toggle-Lock® system is based on links pivoting around a horizontal drive shaft connected to the sliding plate. One issue with conventional drive shaft designs is that railway field personnel do not always use a continuous drive motor, at the drive shaft, to operate the gate and instead impact gate openers are frequently used. Impact-type openers impart a jerk-like torque on the drive shaft and the gate plate. This can cause wear in interconnected components and may cause jamming of the sliding gate during the operation and to the point that it is no longer possible to open and close the gate.

A motorized drive system 702, such as the example illustrated in FIGS. 20 to 29, can facilitate elimination of the use of impact type gate openers. The motor is properly sized so that it is capable of delivering the required torque at a slow speed to open and close the gate. The proper type of gear box is used to deliver the required torque versus speed performance (slow speed, high torque). Weight and size of the motorized system as well as well as its power supply, current limiters and bi-directional switching can also be selected to provide optimal functionality.

As illustrated, the motorized drive system 702, and more particularly the motor 703, is engageable with gate components 704.

The various components of the motorized drive system 702 can be integrated into the covered hopper car. The motor 703 can be engaged at the capstan of the drive shaft. The motor 703 can be selected or designed in order to fit into a confined area. The system 702 can also be positioned and/or provided with safety systems so that no outside non-authorized personnel would have the capability to operate the gates 700. In terms of the power source to operate the motors in the field, a solar-based source can be integrated into the system for providing a reliable and environmental source of energy.

The motorized drive system 702 can be applied on a hopper car so as to increase the service life of gravity discharge gates 700. Various components can be provided for inclusion in the system, e.g., a DC motor, a power supply, a current limiter, and a bi-directional switch. In addition, a connector to be fastened (e.g., bolted) to the motor shaft and the drive shaft, and a footing added to the base of the motor 703 so that it can be secured can also be added to facilitate engaging the motor to the drive shaft. In addition, a stand that holds the motor 703 can be configured so that the torque imparted on the motor footing does not damage the footing itself.

Various components have been evaluated. Many types of motors were assessed. Preferred motors are configured to deliver slow speed and high torque that are desirable for this application. In addition, the weight and size of the motors is preferably such that the motor can fit within the clearance envelope for attaching the motor to the drive shaft while being light and still providing the desired torque. Bi-directional switches and current limiters were configured and adapted to the system to provide enhanced functionality. As for the connector, it was designed to couple the motor shaft to the capstan of the drive shaft. A motor was tried without load (no load RPM) to test operation which was successful. The no load current that was tested was also in accordance to the specification of the motor.

The system 702 was then set up to conduct further experimentation trials under load by actually engaging the motor 703 with the drive shaft. The motor 703 was secured with a footing on a stand and aligned with the capstan so that there was minimal or no waste in energy as the motor develops the torque required to open and close the gate. During these trials, the gate 700 was opened and closed while cycle times were recorded. From these experimental trials, the following variables were determined from testing the DC motor: the RPM when the motor is under load; the breakaway torque value; the current that the motor draws under load; and timing of the opening and closing cycles. Torque versus time performance graphs were generated and compared with reference performance graphs to confirm motor size and horsepower adequacy for in-service application and testing. In addition, motor design and construction features can be determined by conducting testing that include sample hopper gates with various stages of accumulated service mileage to ensure that the selected motor is capable of operating service-worn gates.

A continuous type motor drive system was developed to operate gravity type discharge gates, and such a system that be used to replace impact type gate openers, thus increasing the service life of gravity discharge gates. The gate opening and closing can be much smoother and quicker; opening and closing of gates is safer; there is reduced or eliminated jamming of the sliding gate plate; and much less wear in interconnected gravity gate components can be achieved.

Power supply to various components and equipment in rail applications described herein can include a solar based system. For instance, power supply to the motors 703 can be provided by leveraging solar power and battery assemblies to supply the required energy to the motors to smoothly and efficiently open and close the gates. Solar-powered motorized gate opening and closing can facilitate fast and smooth opening and closing of the gates, enhanced safety, reduced or no jamming of the siding gate plate, less wear in interconnected gravity gate components, and additional integration of solar power with other components, equipment or instrumentation of the cars (e.g., end-hose adapters, battery recharge units, etc.).

Solar panels can be added on sides of freight cars near the top, for example. The overall system can also include a rechargeable battery, a controller, switches and the solar panels themselves, to power the motorized gravity discharge gates.

Incorporation of solar panels onto hopper cars to create an energy source which, with the help of a battery, can power equipment such as a motor to smoothly operate the motorized hopper gates is a novel and advantageous concept. There are significant benefits in having electrical power on individual covered hopper cars. This source of power on many or every car can provide the means to operate gravity discharge gates using electric motors applied at the end of the capstans and can also power other equipment such as the SMART™ adapters described above. The solar panel system is the preferred type of on board power source to activate automatically the gates and charge batteries.

In terms of implementation of the solar panel system, one challenge relates to winter operation in Canada or the United States where snow accumulation on car tops could restrict the solar panels' exposure to sun light and hence reducing efficiency. Positioning of the solar panels can thus be adapted for enhanced operations and ensure that there will always be enough electric current to charge the batteries.

The components of the solar power system include solar panels, a solar controller, a battery, switches, and a motor (which was further described above and can include additional equipment and components). The wattage desired for the solar panels was determined and was based on the amperes of electricity each panel can put out per hour in peak blue sky sunny day. Assumptions were made for rainy and overcast days when it will not be possible to obtain the full amperage. Estimations were made as to how much reduction in supply of amperage will occur during the days when the sky is not sunny. Based on these determinations and on the amperage requirement of an exemplary DC motor, the solar panel wattage was determined in a manner to ensure that the solar panels can supply the amperage needed to run the DC motor. It was also estimated how long the battery needed to keep the charge based on freight car turnaround time. Selection of a solar controller to be paired with the solar panels was also made. Also determined was the desired horsepower for the DC motor to open and close the gate based on the torque required to operate the gate. After determining the horsepower, the current and voltage requirements were established. An electronic logistics circuit was also produced for incorporation into the system.

Solar panels can be provided to supply the required energy, in combination with a battery, to smoothly open and close the hopper car gravity discharge gates equipped with motors. Accordingly, enhanced gate operation can be achieved, as described further above.

In terms of positioning of the solar panels, they can be provided on the sides of freight cars at pre-determined locations to maximize sun exposure while minimizing snow accumulation. In some implementations, flexible solar panels can be mounted to the upper side of the car, for example vertically above a mid point of the car. A plurality of solar panels, which are on a single car and/or on multiple different cars, can be networked together to supply various components with power.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the scope defined in the appended claims.

The invention claimed is:

1. A method for indicating brake air pressure status in brake pipes of multiple interconnected train cars, the method comprising:
   providing at least one end-hose adapter per train car, each end-hose adapter comprising:
      a housing comprising:
         opposed ports connectable with a train car end hose and a brake pipe respectively;
         an exterior surface; and
         a channel extending between the opposed ports and being in fluid communication with brake air within the brake pipe;
      a pressure sensor mounted to the housing and extending within the channel, the pressure sensor being configured to sense brake air pressure within the brake pipe and generate a brake air pressure signal;
      a control unit operatively connected to the pressure sensor to receive the brake air pressure signal, and configured to generate control signals comprising:
         a first control signal when the brake air pressure signal indicates a brake air pressure above a pre-determined pressure threshold; and
         a second control signal when the brake air pressure signal indicates a brake air pressure below the pre-determined pressure threshold;
      a light system mounted with respect to the exterior surface of the housing and configured to receive the control signals from the control unit and to display different colors in response to different control signals; and
      a power source connected to the pressure sensor, the control unit, and the light system to provide power thereto;
   operating each of the end-hose adapters to sense the corresponding brake air pressure within the corresponding brake pipe to which the end-hose adaptor is mounted such that:
      when the brake air pressure in the brake pipe is above the pre-determined pressure threshold, the light system of the end-hose adapter is operated to display a first colour; and
      when the brake air pressure in the brake pipe is below the pre-determined pressure threshold, the light system of the end-hose adapter is operated to display a second colour indicating air leakage in that brake pipe.

2. The method of claim 1, wherein the control unit is a logic circuit, the first control signal and the second control signal are electrical signals, and the pressure sensor is an electrical pressure sensor.

3. The method of claim 1, wherein the light system comprises a plurality of lights mounted to the exterior surface of the housing in spaced-apart relation with respect to each other.

4. The method of claim 3, wherein the lights comprise light emitting diodes (LEDs).

5. The method of claim 3, wherein the lights are configured such that all of the lights simultaneously display either the first color or the second color.

6. The method of claim 3, wherein the housing comprises:
   a primary housing defining the channel and having the opposed ports and the opposed ends thereof, the primary housing comprising an opening through which part of the pressure sensor extends to be positioned within the channel; and
   a secondary housing mounted about the primary housing, the lights being mounted with respect to the secondary housing.

7. The method of claim 6, wherein the primary housing comprises a cylindrical pipe and a flange extending outward at an end region thereof, the flange being configured to abut against an axial surface of the secondary housing.

8. The method of claim 7, wherein the secondary housing comprises molded resin, and wherein part of the lights and part of the pressure sensor are embedded within the molded resin.

9. A method for indicating brake air pressure status in brake pipes of multiple interconnected train cars, the method comprising operating at least one end-hose adapter per train car, each end-hose adapter being mounted between a train car end hose and a brake pipe to be in fluid communication therewith and being configured to sense the brake air pressure in the brake pipe and provide first visual indication when the brake air pressure is within an operable range and a second visual indication when the brake air pressure is below an operable value and is experiencing leakage.

10. The method of claim 9, wherein each end-hose adapter comprises:

a housing comprising:
  opposed ports connectable with the corresponding train car end hose and the corresponding brake pipe respectively;
  an exterior surface; and
  a channel extending between the opposed ports and being in fluid communication with brake air within the brake pipe;
a pressure sensor mounted to the housing and extending within the channel, the pressure sensor being configured to sense the brake air pressure within the brake pipe and generate a brake air pressure signal;
a control unit operatively connected to the pressure sensor to receive the brake air pressure signal, and configured to generate control signals comprising:
  a first control signal when the brake air pressure signal indicates a brake air pressure above a pre-determined pressure threshold; and
  a second control signal when the brake air pressure signal indicates a brake air pressure below the pre-determined pressure threshold;
a light system mounted with respect to the exterior surface of the housing and configured to receive the control signals from the control unit and to display the first and second visual indications in response to different control signals.

11. The method of claim 10, further comprising a power source comprising a battery that is operatively connected to the pressure sensor and the light system to provide power thereto and is mounted within the housing.

12. The method of claim 10, wherein the pre-determined pressure threshold is between predetermined pressure levels which range from 25 psi to 75 psi.

13. An end-hose adapter for indicating brake air pressure status in a brake pipe of a train car, the end-hose adapter comprising:
  a housing comprising:
    opposed ports connectable with a train car end hose and a brake pipe respectively;
    an exterior surface; and
    a channel extending between the opposed ports in fluid communication with brake air within the brake pipe;
  a pressure sensor mounted to the housing and extending within the channel, the pressure sensor being configured to sense brake air pressure within the brake pipe and generate a brake air pressure signal;
  a light system mounted with respect to the exterior surface of the housing to be visible to a user, the light being configured to receive signals derived from the brake air pressure signal, and in response to the signals:
    display a first color when the brake air pressure in the brake pipe is above the pre-determined pressure threshold; and
    display a second colour indicating air leakage when the brake air pressure in the brake pipe is below the pre-determined pressure threshold.

14. The end-hose adapter of claim 13, wherein the light system comprises a plurality of lights mounted to the exterior surface of the housing in spaced-apart relation with respect to each other.

15. The end-hose adapter of claim 14, wherein the lights are mounted around a radial periphery of the housing or along a longitudinal section of the housing.

16. The end-hose adapter of claim 14, wherein the external surface of the housing comprises a plurality of depressions and the lights are at least partially embedded within respective depressions.

17. The end-hose adapter of claim 13, further comprising:
a control unit operatively connected to the pressure sensor to receive the brake air pressure signal, the control unit being configured to generate control signals comprising:
  a first control signal when the brake air pressure signal indicates a brake air pressure above a pre-determined pressure threshold; and
  a second control signal when the brake air pressure signal indicates a brake air pressure below the pre-determined pressure threshold; and
wherein the control unit is operatively connected to the light system to provide the control signals thereto to display the first or second color.

18. The end-hose adapter of claim 17, wherein the control unit is a logic circuit, the pressure sensor is an electrical pressure sensor, and the first control signal the second control signal are electrical signals.

19. The end-hose adapter of claim 13, wherein the housing comprises:
  a primary housing defining the channel and having the opposed ports and the opposed ends thereof, the primary housing comprising an opening through which part of the pressure sensor extends to be positioned within the channel; and
  a secondary housing mounted about the primary housing, the lights being mounted with respect to the secondary housing;
  wherein the primary housing comprises a cylindrical pipe, and the secondary housing is composed of molded resin, and wherein part of the light and part of the pressure sensor are embedded within the molded resin.

20. The end-hose adapter of claim 13, further comprising a power source operatively connected to the pressure sensor and the light system to provide power thereto.

21. The end-hose adapter of claim 20, wherein the power source comprises a battery mounted within the housing.

22. The end-hose adapter of claim 21, wherein the power source further comprises a solar panel mounted to part of the external surface of the housing and coupled to the battery for providing power thereto.

23. The end-hose adapter of claim 13, further comprising:
  a logic circuit operatively connected to the pressure sensor to receive the brake air pressure signal, the logic circuit being configured to generate control signals comprising:
    a first control signal when the brake air pressure signal indicates a brake air pressure above a pre-determined pressure threshold; and
    a second control signal when the brake air pressure signal indicates a brake air pressure below the pre-determined pressure threshold; and
    wherein the logic circuit is operatively connected to the light system to provide the control signals thereto to display the first or second color; and
  a power source operatively connected to the pressure sensor and the light system to provide power thereto; and
  wherein the housing comprises:
    a primary housing defining the channel and having the opposed ports and the opposed ends thereof, the primary housing comprising an opening through which part of the pressure sensor extends to be positioned within the channel; and a secondary housing mounted about the primary housing, wherein the lights, the power source and the logic circuit are mounted with respect to the secondary housing.

24. The end-hose adapter of claim 23, wherein the power source, part of the light system, and the logic circuit are embedded within the secondary housing that comprises a molded body.

* * * * *